US010809083B1

(12) United States Patent
Singh et al.

(10) Patent No.: US 10,809,083 B1
(45) Date of Patent: Oct. 20, 2020

(54) USING SENSOR DATA FOR COORDINATE PREDICTION

(71) Applicant: Uber Technologies, Inc., San Francisco, CA (US)

(72) Inventors: Shivendra Pratap Singh, Redwood City, CA (US); Upamanyu Madhow, Santa Barbara, CA (US); Vikram Saxena, Cupertino, CA (US); Livia Zarnescu Yanez, Menlo Park, CA (US); Chandan Prakash Sheth, Fremont, CA (US); Sheng Yang, Fremont, CA (US); Alvin AuYoung, San Jose, CA (US)

(73) Assignee: Uber Technologies, Inc., San Francisco, CA (US)

( * ) Notice: Subject to any disclaimer, the term of this patent is extended or adjusted under 35 U.S.C. 154(b) by 361 days.

(21) Appl. No.: 15/859,422

(22) Filed: Dec. 30, 2017

(51) Int. Cl.
| | |
|---|---|
| *G01C 21/34* | (2006.01) |
| *G01C 21/36* | (2006.01) |
| *G01C 21/20* | (2006.01) |
| *G06N 5/02* | (2006.01) |
| *G06F 16/29* | (2019.01) |

(52) U.S. Cl.
CPC ......... *G01C 21/3446* (2013.01); *G01C 21/20* (2013.01); *G01C 21/362* (2013.01); *G06F 16/29* (2019.01); *G06N 5/022* (2013.01)

(58) Field of Classification Search
None
See application file for complete search history.

(56) References Cited

U.S. PATENT DOCUMENTS

| | | | | |
|---|---|---|---|---|
| 7,072,863 B1 * | 7/2006 | Phillips | ............ | G06Q 40/00 |
| | | | | 703/2 |
| 8,560,236 B1 * | 10/2013 | Zahir | ............ | G01C 21/20 |
| | | | | 701/533 |
| 8,751,427 B1 * | 6/2014 | Mysen | ............ | H04L 67/306 |
| | | | | 706/46 |

(Continued)

OTHER PUBLICATIONS

"Deep learning for satellite imagery via image segmentation", deepsense.ai Big Date Science, https://deepsense.ai/deep-learning-for-satellite-imagery-via-image-segmentation/ Accessed on Oct. 24, 2018, (Apr. 12, 2017), 43 pgs.

(Continued)

*Primary Examiner* — Richard M Camby
(74) *Attorney, Agent, or Firm* — Schwegman Lundberg & Woessner, P.A.

(57) ABSTRACT

Systems and methods of using sensor data for coordinate prediction are disclosed herein. In some example embodiments, for a place, a computer system accesses corresponding service data comprising pick-up data and drop-off data for requests, and accesses corresponding sensor data indicating at least one path of mobile devices of the requesters of the requests, with the at least one path comprising at least one of a pick-up path ending at the pick-up location indicated by the pick-up data and a drop-off path beginning at the drop-off location indicated by the drop-off data. In some example embodiments, the computer system generates at least one predicted geographic location using the paths indicated by the sensor data, and stores the at least one predicted geographic location in a database in association with an identification of the place.

20 Claims, 14 Drawing Sheets

(56) References Cited

U.S. PATENT DOCUMENTS

| | | |
|---|---|---|
| 2017/0193390 A1 | 7/2017 | Weston et al. |
| 2017/0243400 A1 | 8/2017 | Skidmore |
| 2018/0025235 A1 | 1/2018 | Fridman |
| 2018/0197071 A1 | 7/2018 | Dong et al. |
| 2018/0310135 A1 | 10/2018 | Cirit |
| 2019/0145779 A1* | 5/2019 | Li .................. G01C 21/3617 |
| 2019/0171943 A1 | 6/2019 | Pao et al. |
| 2019/0180434 A1 | 6/2019 | Sheth et al. |

OTHER PUBLICATIONS

"Multivariate kernel density estimation", Wikipedia, Retrieved from internet https://en.wikipedia.org/wiki/Multivariate_kernel_density_estimation on Nov. 8, 2018, (accessed Nov. 8, 2018), 10 pgs.

Liang, Xiaodan, et al., "Human Parsing with Contextualized Convolutional Neural Network", CVF Computer Vision Foundation, (Dec. 12, 2016), 9 pgs.

Oquab, Maxime, et al., "Is object localization for free?—Weakly-supervised learning with convolutional neural networks", CVF Computer Vision Foundation, (2015), 685-694.

Shelhamer, Evan, "Fully Convolutional Networks for Semantic Segmentation", arXiv:1605.06211v1 [cs.CV], (May 20, 2016), 12 pgs.

"U.S. Appl. No. 16/021,317, Non Final Office Action dated Nov. 13, 2019", 18 pgs.

"U.S. Appl. No. 16/021,317, Notice of Allowance dated Feb. 28, 2020", 13 pgs.

"U.S. Appl. No. 16/021,317, Response filed Feb. 13, 2020 to Non Final Office Action dated Nov. 13, 2019", 14 pgs.

U.S. Appl. No. 16/021,317, filed Jun. 28, 2018, Deep Learning Coordinate Prediction Using Satellite and Service Data.

* cited by examiner

| PLACE | REQUESTS | SENSOR DATA | PREDICTED GEOGRAPHIC LOCATION(S) |
|---|---|---|---|
| ACME CORP. | REQUEST-1 | GEOCODE-1 FOR DROP-OFF PATH | DROP-OFF GEOGRAPHIC LOCATION (E.G., GEOCODE) |
| | | GEOCODE-2 FOR DROP-OFF PATH | PICK-UP GEOGRAPHIC LOCATION (E.G., GEOCODE) |
| | | . . . | ROOFTOP GEOGRAPHIC LOCATION (E.G., GEOCODE) |
| | REQUEST-2 | GEOCODE-1 FOR PICK-UP PATH | INGRESS GEOGRAPHIC LOCATION (E.G., GEOCODE) |
| | | GEOCODE-2 FOR PICK-UP PATH | EGRESS GEOGRAPHIC LOCATION (E.G., GEOCODE) |
| | . . . | . . . | HOT-SPOT GEOGRAPHIC LOCATION (E.G., GEOCODE) |
| WAYNE ENTERPRISES | | | . . . |

FIG. 5

USING SENSOR DATA FOR COORDINATE PREDICTION

TECHNICAL FIELD

Embodiments of the present disclosure relate generally to the technical field of geographic positioning for a networked computer system and, more particularly, but not by way of limitation, to systems and methods of using sensor data for coordinate prediction.

BACKGROUND

A networked computer system can receive, from user devices, a request for a service. The request can include data related to a place that is to be involved in the providing of the service. For example, a user may submit a request, via the networked computer system, to be transported from a first place to a second place. The networked computer system may then transmit a geographical location of the first place and a geographical location of the second place to a device of a service provider for use in providing the service to the requester. However, although the request may include an identification of a place, the networked computer system may not have the corresponding geographical location of the place readily available. Additionally, current networked computer systems suffer from poor accuracy in predicting the actual geographical location of a place for which a user is requesting the service. For example, even though a request may include an address or a name of a place for which an address can be determined, the address of a place often does not accurately represent the precise location where the service should be provided.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a mapping of corresponding data for different places, in accordance with some example embodiments.

DETAILED DESCRIPTION

Figure 1:
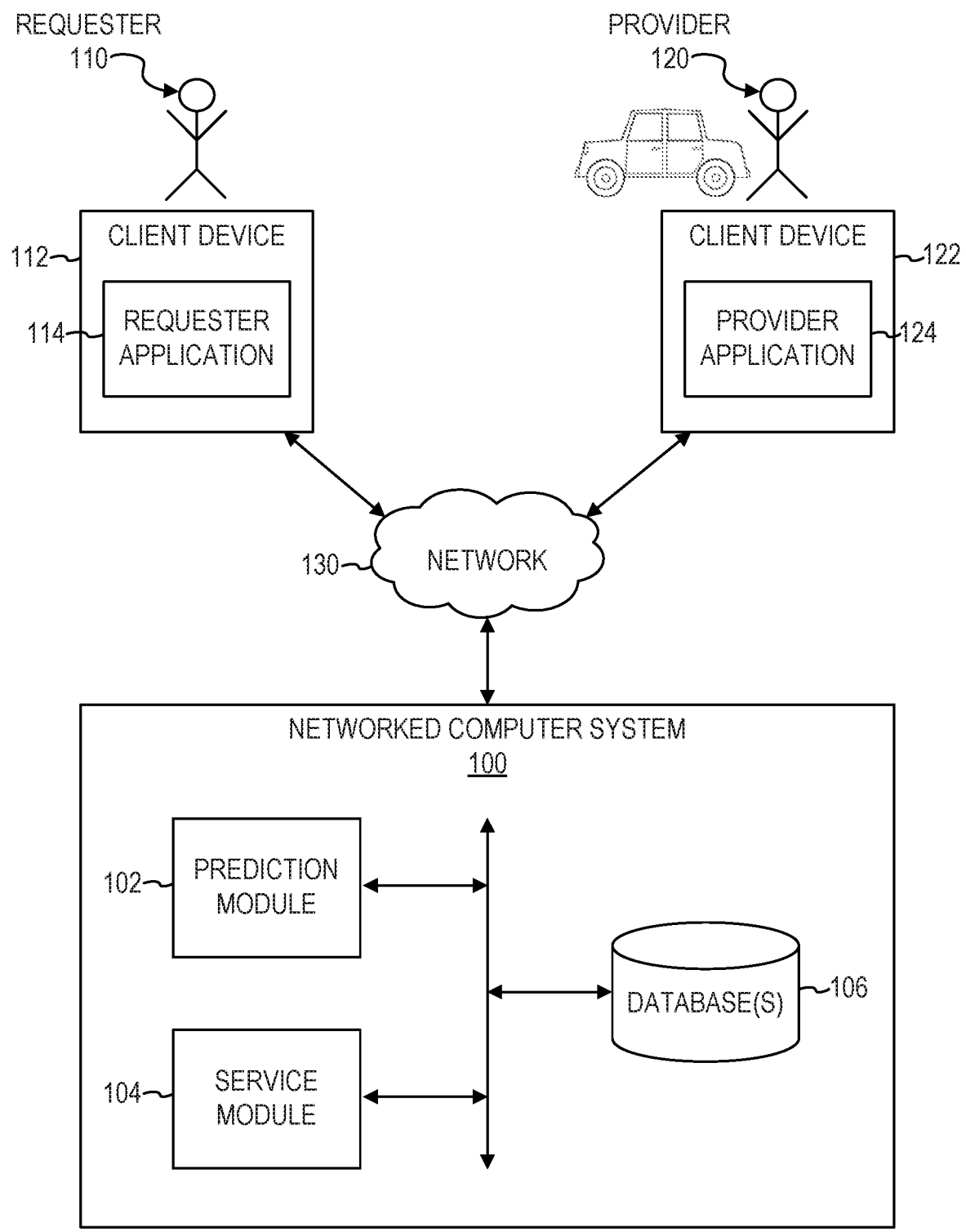
FIG. 1 is a block diagram of a system environment for a networked computer system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for improving the accuracy of computer-implemented coordinate prediction. In some example embodiments, a technical solution involves using sensor data of mobile devices to generate one or more predicted geographical locations of a place, with the sensor data indicating paths of the mobile devices that were traveled in association with transportation services associated with the place, such as pick-up paths ending at pick-up locations for transportation services associated with the place or drop-off paths beginning at drop-off locations for transportation services associated with the place. The predicted geographical location(s) of a place may then be used in servicing requests for transportation services associated with the place. One technical effect of the system and method of the present disclosure is to improve the accuracy of coordinate prediction by networked computer systems. Additionally, other technical effects will be apparent from this disclosure as well.

In some example embodiments, operations are performed by a computer system (or other machine) having a memory and at least one hardware processor, with the operations comprising: for a place, accessing corresponding service data for each one of a plurality of requests for a transportation service associated with the place, the transportation service comprising transportation of a requester of the request to or from the place, the corresponding service data comprising an identification of the place, pick-up data indicating a pick-up location where the transportation of the requester began, and drop-off data indicating a drop-off location where the transportation of the requester ended; accessing corresponding sensor data for each one of the plurality of requests, the corresponding sensor data indicating at least one path of a mobile device of the requester, the at least one path comprising at least one of a pick-up path and a drop-off path, the pick-up path ending at the pick-up location indicated by the pick-up data, the drop-off path beginning at the drop-off location indicated by the drop-off data; generating at least one predicted geographic location using the paths indicated by the sensor data of the plurality of requests; and storing the at least one predicted geographic location in a database in association with an identification of the place.

In order to obtain the sensor data of a mobile device of a user (e.g., a requester or a provider), the computer system (or another computer system) requests permission from the user to track the location of the mobile device before and after the trip of the requested transportation service. If the user agrees to permit the tracking of the location of the mobile device before and after the trip, then such sensor data of the mobile device is collected and used for further processing, as disclosed herein. In this way, the user of a mobile device controls what information of the user is collected and used by the computer system, as the location of the mobile device of a user is only tracked if the user knowledgeably consents to such data gathering.

In some example embodiments, the operations further comprise: receiving another request for the transportation service associated with the place from a computing device of another requester, the other request comprising the identification of the place; identifying at least one of the at least one predicted geographical location of the place based on a search of the database using the identification of the place; and transmitting the at least one of the at least one predicted geographical location of the place to a computing device of another provider of the transportation service of the other request.

In some example embodiments, the corresponding sensor data for each one of the plurality of requests comprises a plurality of geocodes forming the corresponding at least one path indicated by the sensor data, and the generating the at least one predicted geographic location comprises applying at least one clustering algorithm on the paths indicated by the sensor data of the plurality of requests. In some example embodiments, the generating the at least one predicted geographic location further comprises determining a point of peak concentration from among the paths indicated by the sensor data of the plurality of requests based on the application of the at least one clustering algorithm on the paths indicated by the sensor data of the plurality of requests, and generating the at least one predicted geographic location based on the point of peak concentration.

In some example embodiments, the at least one predicted geographical location of the place comprises at least one geocode. In some example embodiments, the use of the paths in generating the at least one predicted geographical location is based on a determination that an amount of the service data for the place satisfies a minimum threshold amount.

In some example embodiments, the at least one predicted geographical location of the place corresponds to a point of intersection among a plurality of the paths indicated by the sensor data of the plurality of requests. In some example embodiments, the at least one predicted geographical location of the place corresponds to a centroid of the paths indicated by the sensor data of the plurality of requests.

In some example embodiments, for each one of the plurality of requests, the at least one path indicated by the sensor data comprises the pick-up path and the drop-off path, the generating the at least one predicted geographic location comprises generating a drop-off geographic location for the place using the drop-off paths indicated by the sensor data for the plurality of requests and generating a pick-up geographic location for the place using the pick-up paths indicated by the sensor data for the plurality of requests, and the storing the at least one predicted geographic location comprises storing the drop-off geographic location as a drop-off attribute associated with the identification of the place in the database and storing the pick-up geographic location as a pick-up attribute associated with the identification of the place in the database.

In some example embodiments, the operations further comprise: receiving another request for another transportation service associated with the place from a mobile device of another requester, the other request comprising an indication of the place as a destination, and the other transportation service comprising transportation of the other requester of the other request to the place; accessing the drop-off attribute associated with the identification of the place based on the indication of the place as a destination; identifying the drop-off geographic location based on the accessing the drop-off attribute; and transmitting the drop-off geographical location of the place to a computing device of another provider of the transportation service of the other request for display on the computing device of the other provider in association with the other request.

In some example embodiments, the operations further comprise: receiving another request for another transportation service associated with the place from a mobile device of another requester, the other request comprising an indication of the place as an origin, and the other transportation service comprising transportation of the other requester of the other request from the place; accessing the pick-up attribute associated with the identification of the place based on the indication of the place as an origin; identifying the pick-up geographic location based on the accessing the pick-up attribute; and transmitting the pick-up geographical location of the place to a computing device of another provider of the transportation service of the other request for display on the computing device of the other provider in association with the other request.

In some example embodiments, the generating the at least one predicted geographic location also uses boundary data of the place, the boundary data comprising any combination of one or more of map data of the place, global positioning system (GPS) data of the mobile device of the requester, Wi-Fi data of the mobile device of the requester, architectural data of the place, and image data of the place captured from a perspective of a street level. In some example embodiments, the generating the at least one predicted geographic location comprises: for each one of the plurality of requests, identifying a portion of the at least one path indicated by the corresponding sensor data that is within a boundary of the place based on the boundary data of the place; for each one of the plurality of requests, trimming the identified portion of the at least one path indicated by the corresponding sensor data to form a trimmed version of the at least one path that excludes the identified portion; and generating the at least one predicted geographic location using the trimmed versions of the paths indicated by the sensor data of the plurality of requests. In some example embodiments, the boundary data comprises at least one of the GPS data of the mobile device of the requester and the Wi-Fi data of the mobile device of the requester, the GPS data indicating a GPS signal strength, and the Wi-Fi data indicating a Wi-Fi signal strength.

In some example embodiments, the generating the at least one predicted geographic location comprises generating a rooftop geographic location for the place using the paths indicated by the sensor data for the plurality of requests, and the storing the at least one predicted geographic location comprises storing the rooftop geographic location as a rooftop attribute associated with the identification of the place in the database, and the operations further comprise: receiving another request for another transportation service associated with the place from a mobile device of another requester, the other request comprising an indication of the place as a destination, and the other transportation service comprising transportation of the other requester of the other request to the place; accessing the rooftop attribute associated with the identification of the place based on receiving of the other request; identifying the rooftop geographic location based on the accessing the rooftop attribute; and transmitting the rooftop geographical location of the place to a mobile device of the other requester of the transportation service of the other request for display on the mobile device of the other requester in association with the other request. In some example embodiments, the transmitting of the rooftop geographical location of the place to the mobile device of the other requester comprises navigation guidance information to the mobile device of the other requester for display on the mobile device of the other requester, with the navigation guidance information comprising guidance for navigating to the rooftop geographical location from a drop-off geographical location where the transportation service corresponding to the other request has been completed or is estimated to be completed.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a block diagram of a system environment for a networked computer system 100, in accordance with some example embodiments. In some example embodiments, the networked computer system 100 coordinates the transportation of persons and/or goods/items for a service requester 110 (e.g., such as a rider) by a service provider 120 (e.g., a driver of a vehicle). The provider 120 uses a vehicle to provide the transportation to the requester.

In some example embodiments, the networked computer system 100 comprises any combination of one or more of a prediction module 102, a service module 104, and one or more databases 106. These modules and databases are not native components of a generic computer system, and provide structures and functions beyond generic functions of a computer system, as further described below.

In some example embodiments, the modules 102 and 104 and the database(s) 106 reside on a machine having a memory and at least one processor (not shown). In some example embodiments, the modules 102 and 104 and the database(s) 106 reside on the same machine, while in other example embodiments, one or more of modules 102 and 104 and database(s) 106 reside on separate remote machines that communicate with each other via a network (e.g., network 130). It is contemplated that other configurations are also within the scope of the present disclosure.

In some example embodiments, the requester 110 operates a client device 112 that executes a requester application 114 that communicates with the networked computer system 100. The requester operates the requester application 102 to view information about the networked computer system 100, and to make a request for service from the networked computer system 100 for a delivery or transport service ("a trip") of the requester 110 (and, optionally, additional persons) and/or items, for example cargo needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, e.g., a global positioning system (GPS) component, a wireless networking system, or a combination thereof. For purposes of simplicity, as described herein, an origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends a pick-up location to a requester 100 based on historical trip data associated with the origin location.

According to examples herein, the requester client device 112 can transmit a set of data to the networked computer system 100 over a network 130 in response to requester input or operation of the requester application 114. Such data can be indicative of the requester's interest in potentially requesting service (e.g., before actually confirming or requesting the service). For example, the requester 110 may launch the requester application 114 and specify an origin location and/or a destination location to view information about the networked computer system 100 before making a decision on whether to request service. The requester 110 may want to view information about the average or estimated time of arrival for pick up by a provider 120, the estimated time to the destination, the price, the available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 can generate and transmit the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a service via the requester application 114, the requester application 114 can generate data corresponding to a request for the service through the networked computer system 100 (e.g., also referred to herein as a "trip request"). Responsive to receiving a trip request, the networked computer system 100 determines the average estimated time of arrival (ETA) at the pick-up location of providers 120 whose current location is within a threshold distance of the pick-up location (e.g., providers 120 who are all within one mile of the pickup location). In some embodiments, responsive to determining that requester's ETA is within a threshold amount of time of the average ETA of nearby available providers 120, the networked computer system 100 uses information from the trip request to match the requester 110 with an available provider 120. Depending on implementation, the trip request can include requester or device information (e.g., a requester identifier, a device identifier), a service type (e.g., vehicle type) and/or selected service option (such as described herein), an origin location, a destination location, a payment profile identifier, a desired departure time, and/or other data. The networked computer system 100 selects a provider 120 from a set of providers, such as based on the provider's current location and status (e.g., offline, online, available, etc.) and/or information from the trip request (e.g., service type, origin location, and/or destination location), to provide the service for the requester and transport the requester 110 from the origin location to the destination location. Responsive to selecting an available provider 120, the networked computer system 100 sends an invitation message to the provider client device 122 inviting the provider 120 to fulfill the trip request.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA.

If, after matching the requester 110 with an available provider 120, the networked computer system 100 determines that the requester's ETA and the provider's ETA at the pick-up location vary by over a threshold amount of time, the networked computer system 100 can reassign the trip to another available provider 120.

The provider 120 operates a client device 122 executing a provider application 124 that communicates with the networked computer system 100 to provide information indicating whether the provider 120 is available or unavailable to provide transportation services to requesters 110. The provider application 124 can also present information about the networked computer system 100 to the provider 120, such as invitations to provide service, navigation instructions, map data, etc. In one example embodiment, the provider application 124 enables the provider 120 to provide information regarding availability of the provider 120 by logging into the networked computer system 100 and activating a setting indicating that they are currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, e.g., a GPS component, a wireless networking system, or a combination thereof. The provider application 124 further allows a provider 120 to receive, from the networked computer system 100, an invitation message to provide a service for a requesting requester 110, and if the provider 120 accepts via input, the provider application 124 can transmit an acceptance message to the networked computer system 100. The networked computer system 100 can subsequently provide information about the provider 120 to the requester application 114. In another example embodiment, the provider application 124 can enable the provider 120 to view a list of current trip requests and to select a particular trip request to fulfill. The provider application 124 can also receive routing information from the networked computer system 100.

In some example embodiments, the requester client device 112 and provider client device 122 are portable or mobile electronic devices such as smartphones, tablet devices, wearable computing devices (e.g., smartwatches) or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDP A, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, can present information received from the networked computer system 100 on a requester interface, such as a map of the geographic region, and the current location of the requester client device 112 or the provider client device 122. The applications 114 and 124 running on the requester client device 112 and the provider client device 124 can determine the current location of the device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update database(s) 106 with the availability status. The networked computer system 100 is also configured to receive trip requests from the requester application 114 and creates corresponding trip records in the database(s) 108. According to an example embodiment, a trip record corresponding to a trip request can include or be associated with a trip ID, a requester ID, an origin location, a destination location, a service type, pricing information, and/or a status indicating that the corresponding trip request has not been processed. According to one example embodiment, when a provider 120 accepts the invitation message to service the trip request for the requester 110, the trip record can be updated with the provider's information as well as the provider's location and the time when the trip request was accepted. Similarly, location and time information about the service as well as the cost for the service can be associated with the trip record.

In one example embodiment, during the trip, the networked computer system 100 receives information (e.g., periodically) from the provider application 124 indicating the location of the provider's vehicle and/or telematics information (e.g., indications of current speed, acceleration/deceleration, events, stops, and so forth). The networked computer system 100 stores the information in the database(s) 108 and can associate the information with the trip record. In some example embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a trip request through the requester application 114. In one example embodiment, the requester application 114 periodically transmits geospatial location information of the requester client device 112 to the networked computer system 100. The geospatial location information can correspond to a current location data point of the requester client device 112 at an instance in time. Such a location data point can be generated by a location determination module (not shown) in the requester client device 112, e.g., a GPS component, a wireless networking system, or a combination thereof.

In some example embodiments, the requester application 114 and the provider application 124 are configured to display map data indicating a specific geographical location of a place, as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 may display, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off a requester 110 associated with the service request, as well as a route from the current location of the provider 120 or the client device 122 of the provider 120 to the specific geographical location of the place associated with the service request. Similarly, the requester application 114 may display, on the client device 112 of the requester 110, a map that includes a graphic element that corresponds to the current location of the requester 110 or the client device 112 of the requester and a graphic element that corresponds to the specific geographical location of the place associated with the service request, as well as a route from the current location of the requester 110 or the client device 112 of the requester 110 to the specific geographical location of the place associated with the service request.

The map data and the navigation instructions are generated based on the specific geographical location of the place associated with the service request. In some example embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 106, and then transmit the geographical location of the place to the requester application 114 and the provider application 124 for use in generating the corresponding map data and navigation instructions that are to be generated and displayer by the requester application 114 and the provider application 124. In other example embodiments, the corresponding map data and navigation instructions are generated by the networked computer system 100 using the geographical location of the place stored in the database(s) 108 of the networked computer system 100 in association with an identifier of the place (e.g., a name of the place, an address of the place), and then transmitted to the requester application 114 and the provider application 124 for display on client device 112 of the requester 110 and the client device 122 of the provider 120.

In some example embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

In some example embodiments, the prediction module 102 is configured to, for a place, access corresponding service data for each one of a plurality of requests for a transportation service associated with the place. The service data may be stored in and retrieved from the database(s). The transportation service may comprise transportation to the place or transportation from the place. In some example embodiments, the transportation service comprises transportation of the requester 110 of the request. However, it is contemplated that the transportation service may additionally or alternatively comprise transportation of another user, such as a friend, relative, or other acquaintance of the requester 110 of the request (e.g., when the requester submits a request for transportation service for a friend). Accordingly, although examples disclosed herein refer to the client device 112 of the requester 110 of the request, the client device of another user (not shown) may be substituted for the client device 112 of the requester 110 for embodiments in which the other user is the one who is being transported. Additionally, the client device 122 of the provider 120 may also be substituted for the client device 112 of the requester 110 for embodiments in which the transportation service is for transportation of a good rather than for transportation of a person, such as in embodiments in which the transportation service is being used for delivery of food or other products or objects.

In some example embodiments, the corresponding service data for each one of the requests comprises an identification of the place (e.g., a name or an address), pick-up data indicating a pick-up location where the transportation of the requester began (e.g., a name, an address, or a geocode), and drop-off data indicating a drop-off location where the transportation of the requester ended (e.g., a name, an address, or a geocode).

In some example embodiments, the prediction module 102 is configured to access corresponding sensor data for each one of the plurality of requests. The corresponding sensor data may indicate at least one path of the client device 112 of the requester 110. In some example embodiments, the path(s) comprise at least one of a pick-up path and a drop-off path. The pick-up path ends at the pick-up location indicated by the pick-up data, and the drop-off path begins at the drop-off location indicated by the drop-off data.

Figure 2:
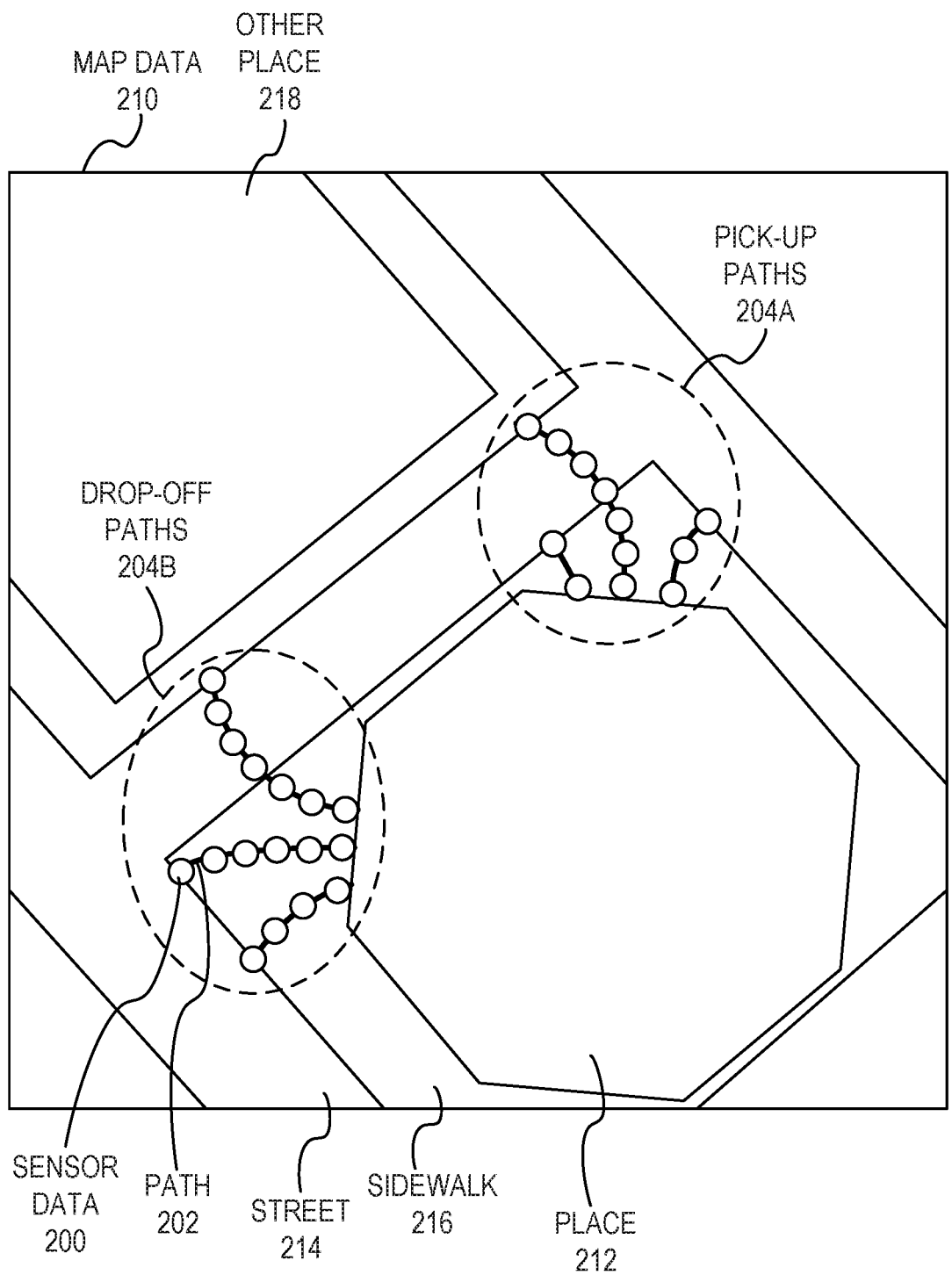
FIG. 2 illustrates sensor data superimposed onto map data of a place, in accordance with some example embodiments.

FIG. 2 illustrates sensor data 200 superimposed onto map data 210 of a place 212, in accordance with some example embodiments. The map data may comprise a map representing the environment in which the place 212 resides, including surrounding streets 214, sidewalks 216, and other places 218. In some example embodiments, the corresponding sensor data 200 for each one of the plurality of requests comprises a plurality of geocodes forming the corresponding path(s) 202 indicated by the sensor data 200. In FIG. 2, these geocodes are represented as circles and the paths 202 are represented as lines connecting the geocodes.

Some paths 202 represent the movement of the client device 112 of the requester 110 from the place 212 to pick-up locations where the requester 110 was picked up by the provider 120 for transportation from the place 212 to another location in servicing the requests for transportation service associated with the place 212. For example, in FIG. 2, such pick-up paths are enclosed within the dotted oval 204A. Other paths 202 represent the movement of the client device 112 of the requester 110 to the place 212 from drop-off locations where the requester 110 was dropped off by the provider in transportation to the place 212 in servicing the requests for transportation service associated with the place 212. For example, in FIG. 2, such drop-off paths are enclosed within the dotted oval 204B.

Figure 3:
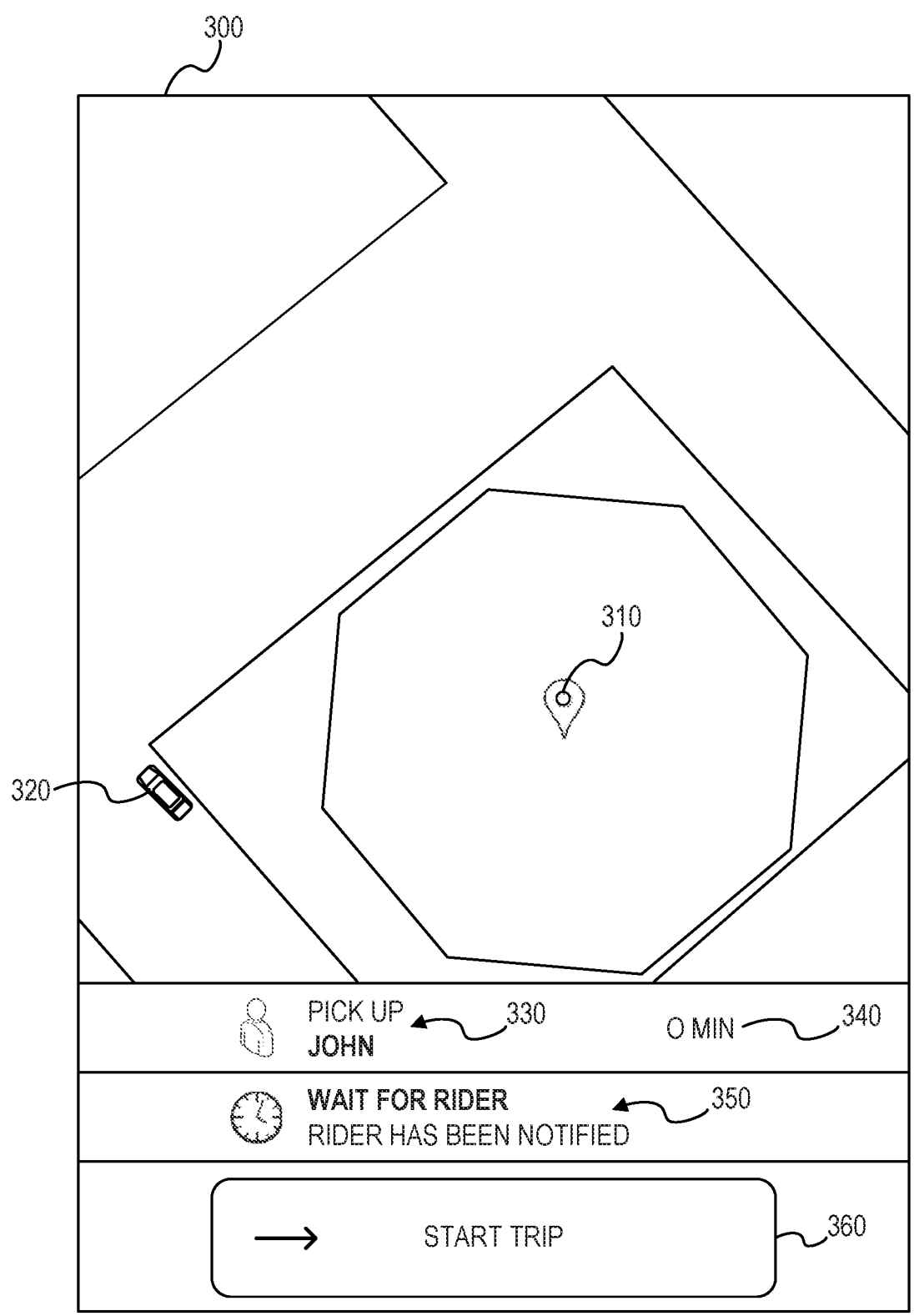
FIG. 3 illustrates a graphical user interface (GUI) in which a provider of a service may signal that the provider has started transporting a requester, in accordance with some example embodiments.

FIG. 3 illustrates a graphical user interface (GUI) 300 in which a provider 120 of a transportation service may signal that the provider 120 has started transporting a requester 110, in accordance with some example embodiments. The GUI 300 may be generated by the provider application 124 and display an indication 310 of the geographical location of the place and an indication 320 of the geographical location of the provider 120 or the client device 122 of the provider 120. The GUI 300 may also display supplemental information, such as an identification 330 of a requester 110 to be picked up by the provider 120, an indication 340 of the amount of time until the provider 120 of the client device 122 of the provider 120 arrives at the pick-up location, and an indication 350 that the requester 110 has been notified that the provider 120 has arrived at the pick-up location. In some example embodiments, the GUI 300 comprises a selectable user interface element 360 (e.g., a button configured to be swiped or tapped by the provider 120) configured to, in response to its selection by the provider 120, trigger the transmission of a signal to the networked computer system 100 indicating that the provider 120 is starting or has started the transporting of the requester 110 in servicing the request. The networked computer system 100 may use the signal to store the geographical location of the provider 120 (e.g., the GPS coordinates of the client device 122 of the provider 120) as pick-up data indicating a pick-up location. The networked computer system 100 may alternatively use the signal to trigger a determination of the geographical location of the client device 112 of the requester 110, using the determined geographical location as pick-up data indicating the pick-up location. In some example embodiments, the pick-up location is used by the prediction module 102 as the ending of the pick-up path discussed above with respect to FIG. 2, and the geographical location of the client device 112 of the requester 110 at a time corresponding to the submission of the request for the transportation service via the client device 112 (e.g., location of the client device 112 is determined in response to the request being submitted or received) is used by the prediction module 102 as the beginning of the pick-up path. The networked computer system 100 may track the path of the client device from the beginning of the pick-up path to the ending of the pick-up path, such as by obtaining a series of GPS coordinates of the client device 112 along the pick-up path.

Figure 4:
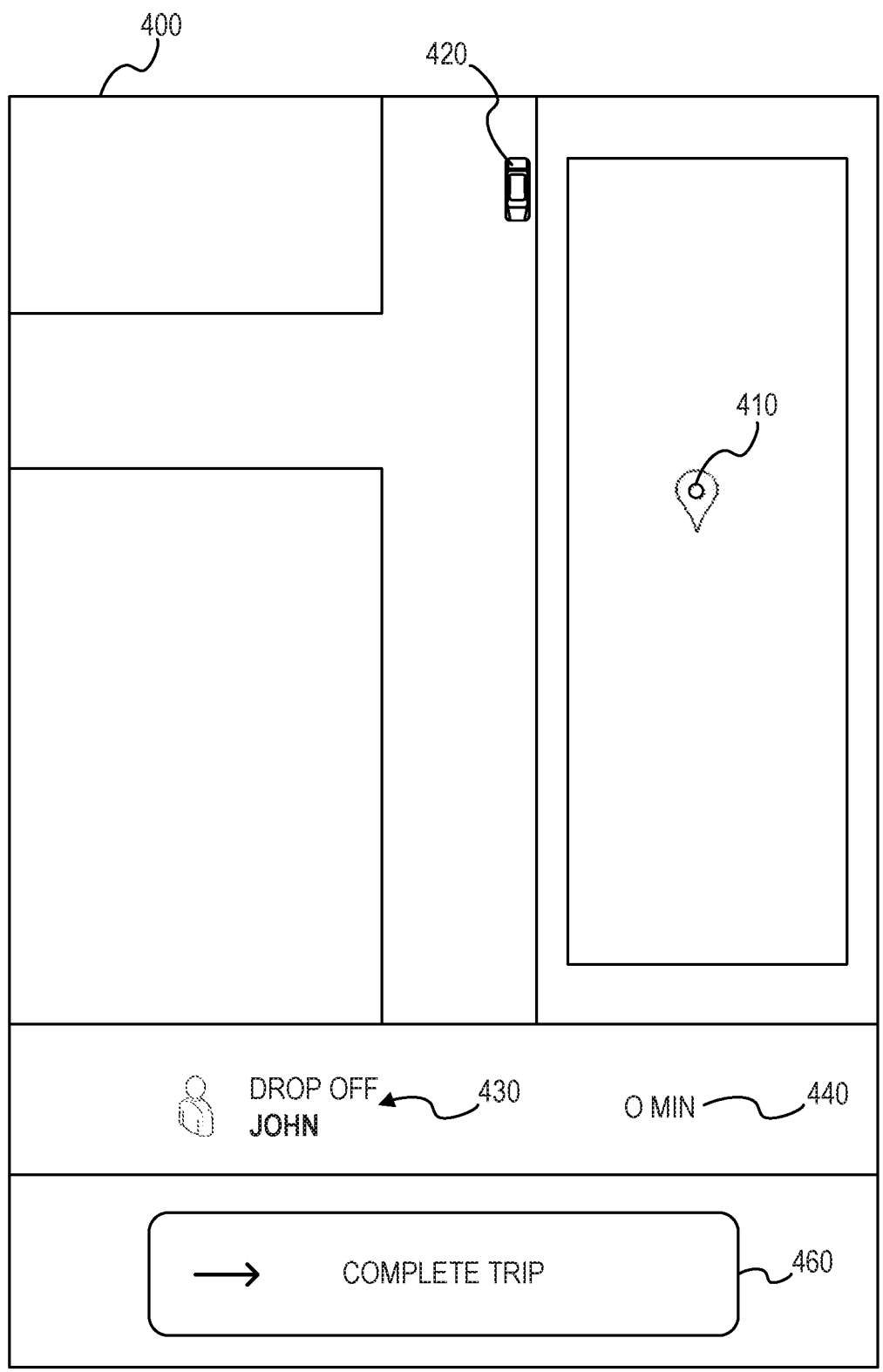
FIG. 4 illustrates a GUI in which the provider of the service may signal that the provider has completed transporting the requester, in accordance with some example embodiments.

FIG. 4 illustrates a GUI 400 in which the provider 120 of the transportation service may signal that the provider 120 has completed transporting the requester 110, in accordance with some example embodiments. The GUI 400 may be generated by the provider application 124 and display an indication 410 of the geographical location of the place and an indication 420 of the geographical location of the provider 120 or the client device 122 of the provider 120. The GUI 400 may also display supplemental information, such as an identification 430 of a requester 110 to be dropped off by the provider 120 and an indication 440 of the amount of time until the provider 120 of the client device 122 of the provider 120 arrives at the drop-off location. In some example embodiments, the GUI 400 comprises a selectable user interface element 460 (e.g., a button configured to be swiped or tapped by the provider 120) configured to, in response to its selection by the provider 120, trigger the transmission of a signal to the networked computer system 100 indicating that the provider 120 is completing or has completed the transporting of the requester 110 in servicing the request. The networked computer system 100 may use the signal to store the geographical location of the provider 120 (e.g., the GPS coordinates of the client device 122 of the provider 120) as drop-off data for the place indicated as the drop-off location in the request submitted by the requester 110. The networked computer system 100 may alternatively use the signal to trigger a tracking of the geographical location of the client device 112 of the requester 110 (e.g., the GPS coordinates of the client device 112 of the requester 110), using the first tracked geographical location of the client device 112 as the drop-off location. In some example embodiments, this drop-off location is used by the prediction module 102 as the beginning of the drop-off path discussed above with respect to FIG. 2. The prediction module 102 may determine the ending of the drop-off path by determining a geographical location of the client device 112 at a predetermined amount of time after the transmission of the signal to the networked computer system 100 indicating that the provider 120 is completing or has completed the transporting of the requester 110 in servicing the request. The prediction module 102 may alternatively determine the ending of the drop-off path by determining a geographical location of the client device 112 at point at which a strength of a GPS signal from the client device 112 is determined to be below a minimum threshold level of strength. In some example embodiments, the prediction module 120 interprets such a low level of strength of the GPS signal as an indication that the client device 112 has entered a building structure of the place for which the transportation service was requested.

In some example embodiments, the pick-up data corresponds to geographical locations of the client device 112 of the requester 110 when the requester 110 indicates, via the requester application 114 on the client device 112, that the provider has started transporting the requester 110 in servicing a request associated with the place 210 (e.g., the provider 120 has picked up the requester 110 at the place 210). Similarly, in some example embodiments, the drop-off data of the service data corresponds to geographical locations of the client device 112 of the requester 110 when the requester 110 indicates, via the requester application 114 on the client device 112, that the provider has completed transporting the requester 110 in servicing a request associated with the place 210 (e.g., the provider 120 has dropped off the requester 110 at the place 210). The requester 110 may signal that the provider 120 is starting or has started transporting the requester 110 and may signal that the provider 120 is completing or has completed transporting the requester via a selectable user interface element displayed on a GUI via the requester application 114 on the client device 112 of the requester 110, similar to how the provider 120 may signal such service-starting points and service-completing points discussed above.

In some example embodiments, the prediction module 102 generates and stores predicted geographical locations for a plurality of places in order to build a comprehensive dataset of all places everywhere with accurate names, addresses, and geographical locations. The stored predicted geographical locations may then be used by the networked computer system 100 to provide map data and navigation instructions on the respective client devices 112 and 122 of the requester 110 and the provider 120, as previously discussed above with respect to FIG. 1.

In some example embodiments, the prediction module 104 is configured to generate at least one predicted geographic location for the place 212 using the paths indicated by the sensor data of the plurality of requests associated with the place 212, and to store the at least one predicted geographic location in the database(s) 106 in association with an identification of the place 212. The at least one predicted geographical location of the place 212 may comprise at least one geocode.

Coordinate prediction is susceptible to imprecision due to GPS errors, as well as activity of the requester 110 before being picked up and after being dropped off. Therefore, in order to solve this technical problem of imprecise coordinate prediction, the prediction module 102 may employ preprocessing and filtering techniques. In some example embodiments, the prediction module 102 is configured to condition the use of the paths in generating the at least one predicted geographical location on a determination that an amount of the service data or the sensor data for the place 212 satisfies a minimum threshold amount, such that the prediction module 102 only uses the paths in generating the at least one predicted geographic location if it is determined by the prediction module 102 that the amount of service data and/or sensor data for the place 212 satisfied the minimum threshold amount. In some example embodiments, the prediction module 102 runs a particle filter on the sensor data to remove noise that could lead to imprecise coordinate prediction.

In some example embodiments, the prediction module 102 is configured to apply at least one clustering algorithm on the paths indicated by the sensor data of the plurality of request in generating the at least one predicted geographic location. The clustering algorithm(s) may include cluster analysis, grouping a set of objects in such a way that objects in the same group or cluster are more similar to each other than to those in other groups or clusters. The clustering algorithm(s) may include a centroid-based clustering or k-means clustering. However, other types of clustering algorithms may also be used.

In some example embodiments, the prediction module 102 is configured to apply the clustering algorithm(s) to determine a peak concentration area or point from among the paths indicated by the sensor data. This determined area or point of concentration can be used by the prediction module 102 to determine a geographic location for the place 212. For example, the prediction module 102 may assign the corresponding geocode of the point of concentration as a geographic location for the place 212.

In some example embodiments, the at least one predicted geographical location of the place 212 corresponds to a point of intersection among a plurality of the paths indicated by the sensor data of the plurality of requests. For example, the prediction module 102 may determine the point of intersection among the plurality of paths indicated by the sensor data of the requests associated with the place 212, and then identify the point of intersection as the predicted geographical location of the place 212.

In some example embodiments, the at least one predicted geographical location of the place 212 corresponds to a centroid of the paths indicated by the sensor data of the plurality of requests. For example, the prediction module 102 may determine the centroid of the paths indicated by the sensor data of the requests associated with the place 212, and then identify the centroid as the predicted geographical location of the place 212.

In some example embodiments, the prediction module 102 is configured to generate one or more predicted geographical locations for the place 212. Such predicted geographical locations may include, but are not limited to, a rooftop geographical location representing the actual location of the place 212, a drop-off geographical location representing a location to be used when dropping off the requester 110 in servicing a request in which the place 212 is identified as a destination or drop-off location, a pick-up geographical location representing a location to be used when picking up the requester 110 in servicing a request in which the place 212 is identified as an origin or pick-up location, an ingress geographical location representing an ingress point or entrance point of a building structure of the place 212, an egress geographical location representing an egress point or exit point of a building structure of the place 212, and other hot-spot geographic locations that represent points of interest in servicing a request in which the place 212 is identified as either a destination/drop-off location or an origin/pick-up location (e.g., a location for parking). It is contemplated that the ingress geographic location may also be used as the drop-off geographic location, that the egress geographic location may also be used as the pick-up geographic location, and that the ingress geographic location may be the same as the egress geographic location. However, it is also contemplated that the ingress geographic location, the drop-off geographic location, that the egress geographic location, and the pick-up geographic location may all have values that are different from one another.

FIG. 5 illustrates a mapping 500 of corresponding data for different places 212, in accordance with some example embodiments. This mapping 500 may be stored in the database(s) 106. As seen in FIG. 5, the mapping 500 comprises an identification of requests (e.g., REQUEST-1, REQUEST-2, . . . ) and sensor data (e.g., GEOCODE-1 FOR DROP-OFF PATH, GEOCODE-2 FOR DROP-OFF PATH, . . . , GEOCODE-1 FOR PICK-UP PATH, GEOCODE-2 FOR PICK-UP PATH, . . . ) associated with an identifier of the place 212 to which they correspond (e.g., ACME CORP.). In some example embodiments, the mapping 500 also comprises predicted geographical locations (e.g., DROP-OFF GEOGRAPHIC LOCATION, PICK-UP GEOGRAPHIC LOCATION, ROOFTOP GEOGRAPHIC LOCATION, INGRESS GEOGRAPHIC LOCATION, EGRESS GEOGRAPHIC LOCATION, HOT-SPOT GEOGRAPHIC LOCATION) that have been generated by the prediction module 102 for the place 212 based on the sensor data associated with the place 212. As seen in FIG. 5, the predicted geographical locations may be stored in association with the identifier of the place 212 for which they were generated for later retrieval and use by the networked computer system 100 in servicing a request for a transportation service associated with the place 212.

In some example embodiments, the prediction module 102 is configured to generate a drop-off geographic location for the place 212 using the drop-off paths indicated by the sensor data and excluding the pick-up paths indicated by the sensor data, and generate a pick-up geographic location for the place 212 using the pick-up paths indicated by the sensor data and excluding the drop-off paths indicated by the sensor data, and then store the drop-off geographic location as a drop-off attribute associated with the identification of the place 212 in the database(s) 106 and store the pick-up geographic location as a pick-up attribute associated with the identification of the place 212 in the database(s) 106, as seen in FIG. 5. In some example embodiments, the prediction module 102 is configured to generate a rooftop geographic location for the place 212 using the paths indicated by the sensor data, including any pick-up paths and drop-off paths indicated by the sensor data, and then store the rooftop geographic location as a rooftop attribute associated with the identification of the place 212 in the database(s) 106. In some example embodiments, the prediction module 102 is configured to generate an ingress geographic location for the place 212 using the drop-off paths indicated by the sensor data and excluding the pick-up paths indicated by the sensor data, and generate an egress geographic location for the place 212 using the pick-up paths indicated by the sensor data and excluding the drop-off paths indicated by the sensor data, and then store the ingress geographic location as an ingress attribute or a drop-off attribute associated with the identification of the place 212 in the database(s) 106 and store the egress geographic location as an egress attribute or a pick-up attribute associated with the identification of the place 212 in the database(s) 106, as seen in FIG. 5.

Figure 6:
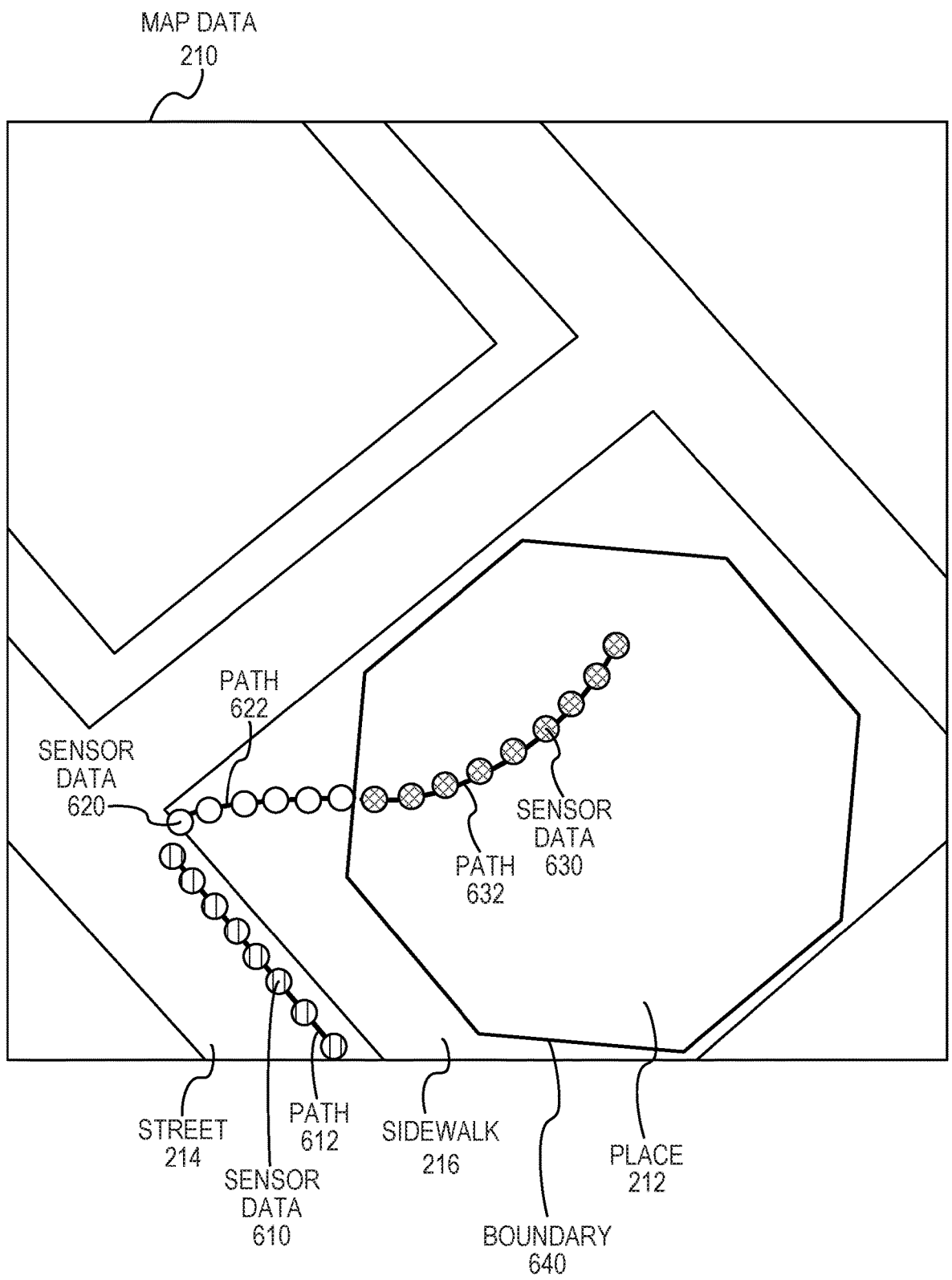
FIG. 6 illustrates sensor data superimposed onto map data of a place, in accordance with some example embodiments.

FIG. 6 illustrates sensor data 610, 620, and 630 superimposed onto the map data 210 of the place 212, in accordance with some example embodiments. Sensor data 610 indicates a path 612 of the mobile device 112 of the requester 110 prior to the requester 110 being dropped off by the provider 120. Sensor data 620 indicates a path 622 of the mobile device 112 of the requester 110 subsequent to the requester 110 being dropped off by the provider and prior to the requester 110 entering a building structure of the place 212 defined by a boundary 640. Sensor data 630 indicates a path 632 of the mobile device 112 of the requester 110 subsequent to the requester 110 entering a building structure of the place 212 defined by the boundary 640.

In some example embodiments, the prediction module 102 uses boundary data of the place 212 in generating the predicted geographic location(s) of the place 212. The boundary data comprises any data that may be used to define a boundary of the place 212. In some example embodiments, the boundary data comprises at least one of map data 210 of the place 212, GPS data of the mobile device 112 of the requester 110, Wi-Fi data of the mobile device 112 of the requester 110, architectural data of the place 212, or image data of the place 212 captured from a perspective of a street level (e.g., an image of the place captured by a camera on the street, such as a camera coupled to a vehicle on the street on which the place is situated). The map data 210 of the place 212 may comprise a map or satellite imagery of the place 212. The architectural data of the place 212 may comprise a blueprint of the place 212. In some example embodiments, any combination of one or more of the above-enumerated boundary and/or one or more other types of boundary data may be used by the prediction module 102 in generating the predicted geographic location(s) of the place 212.

In some example embodiments, the GPS data indicates a GPS signal strength of the mobile device 112 along a path. Since the GPS signal strength of the mobile device 112 will tend to decrease when the mobile device 112 is moved within a building structure, the prediction module 102 may determine that the mobile device 112 is within the building structure of the place 212 (e.g., after entering after being dropped-off or before exiting before being picked-up) based on a determination that the GPS signal strength is below a threshold level for a certain portion of the path.

In some example embodiments, the Wi-Fi data indicates a Wi-Fi signal strength of the mobile device 112 along a path. Since the WiFi signal strength of the mobile device 112 will tend to increase when the mobile device 112 is moved within a building structure, the prediction module 102 may determine that the mobile device 112 is within the building structure of the place 212 (e.g., after entering after being dropped-off or before exiting before being picked-up) based on a determination that the WiFi signal strength is above a threshold level for a certain portion of the path.

The networked computer system 100 may use the identification of these different paths 610, 620, and 630 for a variety of technical solutions. In some example embodiments, the paths indicated by the sensor data associated with the place 212 each comprise the path 610 of the mobile device 112 of the requester 110 prior to the requester 110 being dropped off by the provider 120, the path 622 of the mobile device 112 of the requester 110 subsequent to the requester 110 being dropped off by the provider and prior to the requester 110 entering the building structure of the place 212 defined by the boundary 640, and the path 632 of the mobile device 112 of the requester 110 subsequent to the requester 110 entering the building structure of the place 212 defined by the boundary 640. In order to improve the precision of its coordinate prediction, the prediction module 102 may trim any portion of the path formed by the combination of paths 610, 620, and 630 before generating the geographic location for the place 212 in order to reduce noise. In some example embodiments, the prediction module 102, for each one of the plurality of requests associated with the place 212, identifies portions of the paths indicated by the corresponding sensor data that are within the boundary 640 of the place 212 based on the boundary data of the place 212, trims the identified portions of the paths indicated by the corresponding sensor data to form trimmed versions of the paths that exclude the identified portions, and then generates the predicted geographic location using the trimmed versions of the paths indicated by the sensor data of the plurality of requests. In some example embodiments, the prediction module 102 additionally or alternatively identifies and trims the portions of the paths that are prior to the requester 110 being dropped-off at the place 212 and/or subsequent to the requester 110 being picked up at the place 212.

In some example embodiments, the prediction module 102 is configured to generate an ingress geographic location for the place 212 and an egress geographic location for the place 212 based on the sensor data of the plurality of requests associated with the place 212. In some example embodiments, the sensor data comprises satellite signal strengths. Global Navigation Satellite Systems (GNSS) provide location estimates of a GNSS receiver, such as the client device 112 or any other mobile device, with varying degrees of accuracy, depending on the propagation environment around the GNSS receiver. In particular, when the GNSS receiver is indoors, the signal strengths from most GNSS satellites is too low for an accurate positioning estimate to be computed. In such settings, the client device 112 may employ other sources of positioning, such as WiFi or cellular networks, providing a location estimate which is coarser than what would be provided by GNSS under favorable conditions (e.g., outdoor settings with relatively clear views of the satellites). However, GNSS satellite signal strengths, or more precisely, the Signal-to-Noise Ratios (SNRs) output by the GNSS receiver, provide valuable information even when they are too low to permit accurate GNSS-based positioning. In some example embodiments, the prediction module 102 employs a technique for deriving geometric cues regarding the locations of the client device 112 from satellite signal strengths alone. These geometric cues, when fused with other contextual information, provide valuable information related to semantic location. For example, one application is to estimating the probability that the client device 112 is indoors. Furthermore, tagging crowdsourced GNSS data with these geometric cues can be used to infer specific characteristics of the environment. For example, in a ridesharing context, aggregated and anonymized rider location traces associated with the place 212 (e.g., a mall or an office building), can be used to infer the geographic locations of ingresses and egresses from the place 212 using indoor-outdoor transitions estimated from satellite signal strengths.

Figure 12:
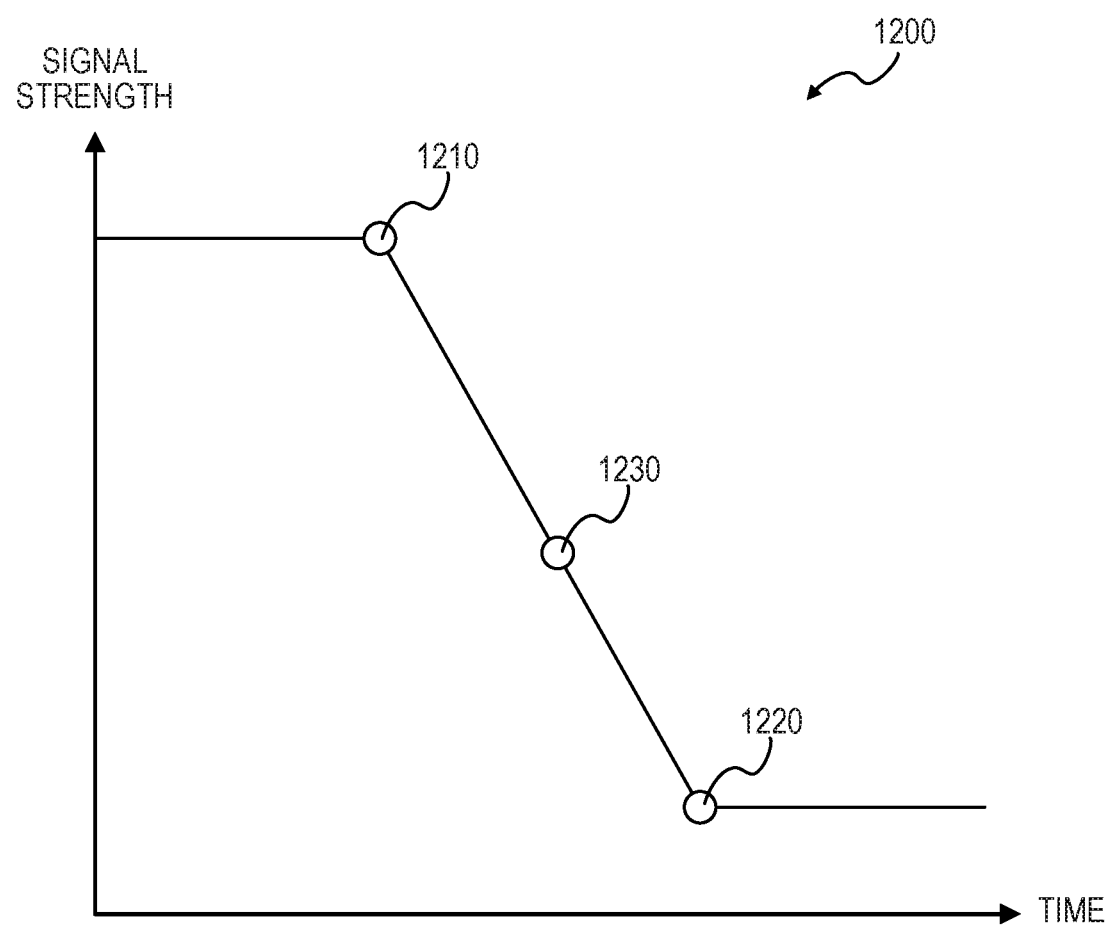
FIG. 12 is a time series graph 1200 plotting satellite signal strength for a client device, which may be used to identify a transition point at which the client device transitions from being outdoors to being indoors, in accordance with some example embodiments.

FIG. 12 is a time series graph 1200 plotting satellite signal strength for a client device 112, which may be used to identify a transition point at which the client device transitions from being outdoors to being indoors, in accordance with some example embodiments. The time series graph 1200 shows corresponding signal strength for the client device 112 as the client device 112, over time, moves from a location outdoors (e.g., outside of a building structure) to a location indoors (e.g., inside of a building structure). The transition point may be determined in a variety of ways. In some example embodiments, the prediction module 102 determines the transition point to be the point at which the signal strength begins to decrease at a rate that satisfies a minimum threshold. For example, in FIG. 12, a transition point 1210 is identified based on the transition point 1210 being the point at which the signal strength begins to drop precipitously. In some example embodiments, the prediction module 102 determines the transition point to be the point at which the signal strength stops decreasing at a rate that satisfies a minimum threshold or levels off. For example, in FIG. 12, a transition point 1220 is identified based on the transition point 1220 being the point at which the signal strength stops dropping precipitously and instead levels off. In some example embodiments, the prediction module 102 determines the transition point to be a point in between the point at which the signal strength begins to decrease at a rate that satisfies a minimum threshold and a point at which the signal strength stops decreasing at a rate that satisfies a minimum threshold or levels off, such as a point in the middle of these two points (e.g., halfway between these two points). For example, in FIG. 12, a transition point 1230 is identified based on the transition point 1230 being halfway between the transition point 1210 and the transition point 1220. It is contemplated that the prediction module 102 may determine a transition point in other ways as well.

Furthermore, a reversed graph of the time series graph 1200 may be used to identify a transition point at which the client device transitions from being indoors to being outdoors, in accordance with some example embodiments. In some example embodiments, the sensor data of a pick-up path for a place 212 is used to determine an egress transition point and thereby an egress geographic location of the place 212, while sensor data of a drop-off path for the place 212 is used to determine an ingress transition point and thereby an ingress geographic location of the place.

In some example embodiments, the prediction module 102 is configured identify a transition point, as discussed above, and use the GPS data of the client device 112 that corresponds to that transition point to determine an ingress geographic location for the place 212 and/or an egress geographic location for the place 212. For example, the prediction module 102 may identify the GPS location of the client device 112 that corresponds to the time at which the client device 112 was at the transition point, and then assign that GPS location that corresponds to the transition point as the ingress geographic location or the egress geographic location.

In some example embodiments, the service module 104 is configured to receiving a request for the transportation service associated with the place 212 from the client device 112 of another requester 110, with the request comprising an identification of the place 212. The service module 104 identifies the predicted geographical location of the place 212 stored in the database(s) 106 based on a search of the database(s) 106 using the identification of the place 212, such as by matching the identification of the place 212 from the request with a corresponding identification of the place 212 in the database(s) 106, and then transmits identified predicted geographical location of the place 212 to the client device 122 of another provider 120 of the transportation service of the request.

In some example embodiments, the request comprises an indication of the place 212 as a destination, and the transportation service comprises transportation of the requester 110 of the request to the place 212. The service module 104 accesses the drop-off attribute associated with the identification of the place 212 based on the indication of the place 212 as a destination, identifies the drop-off geographic location based on the accessing of the drop-off attribute, and transmits the drop-off geographical location of the place 212 to the client device 122 of the provider 120 of the transportation service of the request for display on the client device 122 of the provider 120 in association with the request. For example, the drop-off geographical location of the place may be used to display navigation instructions or guidance on the client device 122.

In some example embodiments, the request comprises an indication of the place 212 as an origin, and the other transportation service comprises transportation of the requester 110 of the request from the place 212. The service module 104 accesses the pick-up attribute associated with the identification of the place 212 based on the indication of the place 212 as an origin, identifies the pick-up geographic location based on the accessing the pick-up attribute, and transmits the pick-up geographical location of the place 212 to the client device 122 of the provider 120 of the transportation service of the request for display on the client device 122 of the provider 120 in association with the request.

In some example embodiments, the request comprises an indication of the place 212 as a destination, and the other transportation service comprises transportation of the requester 110 of the request to the place 212. The service module 104 accesses the rooftop attribute associated with the identification of the place 212 based on receiving of the request, identifies the rooftop geographic location based on the accessing the rooftop attribute, and transmits the rooftop geographical location of the place 212 to the client device 112 of the requester 110 of the transportation service of the request for display on the client device 112 of the requester 110 in association with the request. The service module 104 may transmit navigation instructions or guidance to the client device 112 of the requester 110 for use by the requester in walking, or otherwise traveling, from the rooftop geographical location to a pick-up location for the transportation service or from the drop-off location for the transportation service to the rooftop geographical location. Such navigation instructions or guidance are particularly useful in situations in which the pick-up location is not easily visible or found by the requester 110 immediately after the requester submits the request for the transportation service (e.g., the requester 110 submits the request from a gate inside a terminal of an airport and will be picked up at the curb outside of the terminal) or in which the actual specific location of the place 212 to which the requester wants to go is not easily visible or found by the requester 110 from the drop-off location (e.g., the requester 110 wants to go to a particular store inside a large shopping mall and the drop-off location is in the parking lot outside of the shopping mall). In some example embodiments, the service module 104 transmits navigation guidance information comprising guidance for navigating to the rooftop geographical location from a drop-off geographical location where the transportation service corresponding to the request has been completed or is estimated to be completed.

Figure 7:
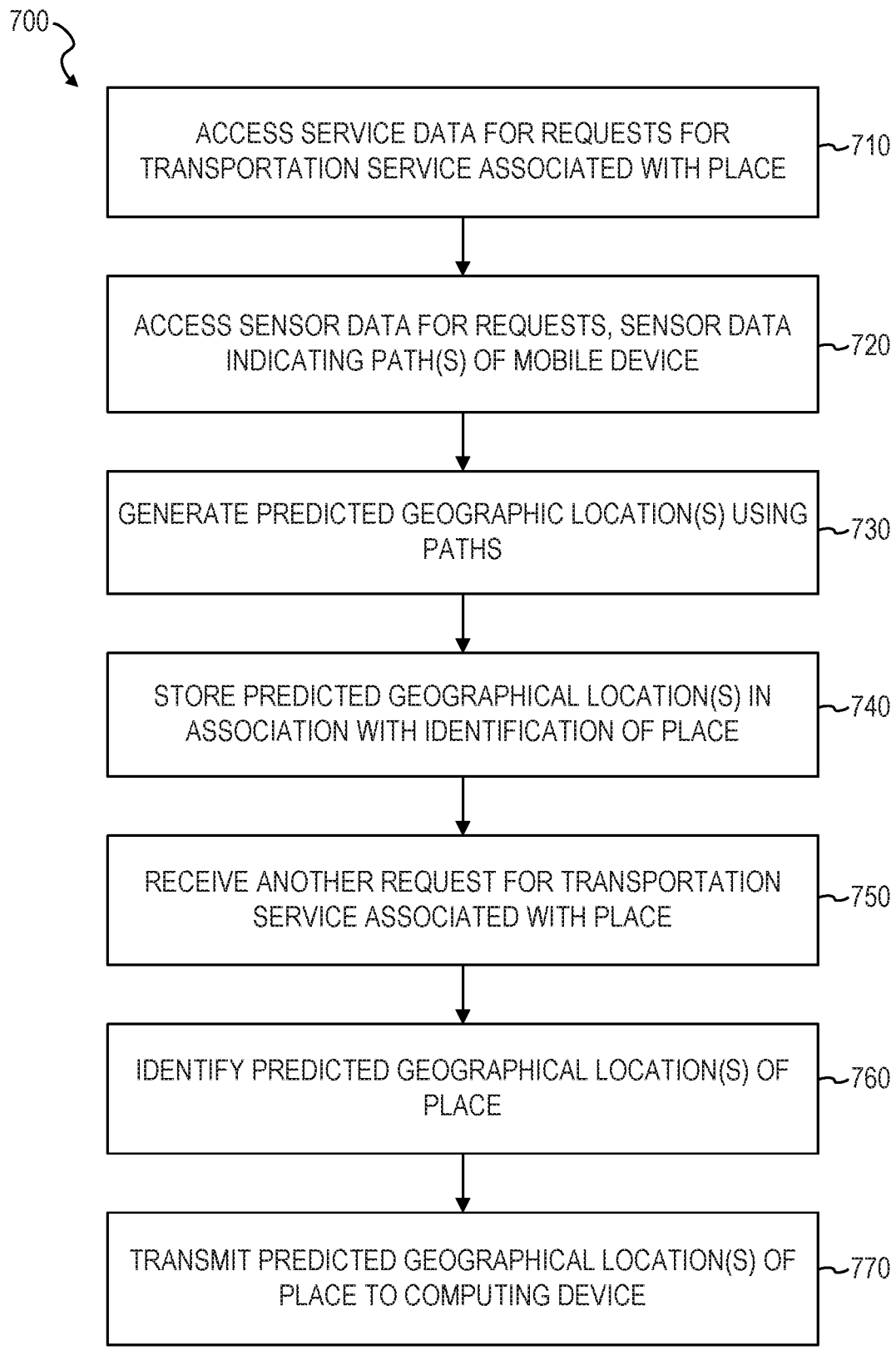
FIG. 7 is a flowchart illustrating a method of using sensor data for coordinate prediction, in accordance with some example embodiments.

FIG. 7 is a flowchart illustrating a method 700 of using sensor data for coordinate prediction, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the networked computer system 100 of FIG. 1, or any combination of one or more of its components or modules (e.g., prediction module 102, service module 104), as described above.

At operation 710, the networked computer system 100, for a place 212, accesses corresponding service data for each one of a plurality of requests for a transportation service associated with the place 212. The transportation service comprises transportation of a requester 110 of the request to or from the place 212. The corresponding service data comprises an identification of the place 212, pick-up data indicating a pick-up location where the transportation of the requester 110 began, and drop-off data indicating a drop-off location where the transportation of the requester 110 ended.

At operation 720, the networked computer system 100 accesses corresponding sensor data for each one of the plurality of requests. The corresponding sensor data indicates at least one path of a mobile device 112 of the requester 110. The at least one path comprises at least one of a pick-up path and a drop-off path. The pick-up path ends at the pick-up location indicated by the pick-up data, and the drop-off path begins at the drop-off location indicated by the drop-off data.

At operation 730, the networked computer system 100 generates at least one predicted geographic location using the paths indicated by the sensor data of the plurality of requests. In some example embodiments, the corresponding sensor data for each one of the plurality of requests comprises a plurality of geocodes forming the corresponding at least one path indicated by the sensor data, and the generating the at least one predicted geographical location comprises applying at least one clustering algorithm on the paths indicated by the sensor data of the plurality of requests. In some example embodiments, the at least one predicted geographical location of the place corresponds to a point of intersection among a plurality of the paths indicated by the sensor data of the plurality of requests. In some example embodiments, the at least one predicted geographical location of the place corresponds to a centroid of the paths indicated by the sensor data of the plurality of requests. In some example embodiments, the at least one predicted geographical location of the place comprises at least one geocode. In some example embodiments, the use of the paths in generating the at least one predicted geographical location is based on a determination that an amount of the service data for the place satisfies a minimum threshold amount.

At operation 740, the networked computer system 100 stores the at least one predicted geographic location in a database 106 in association with an identification of the place 212. For example, the networked computer system 100 may store predicted geographic locations in accordance with the mapping 500 disclosed in the example embodiment of FIG. 5.

At operation 750, the networked computer system 100 receives another request for the transportation service associated with the place 212 from a client device 112 of another requester 110. The other request comprises the identification of the place 212.

At operation 760, the networked computer system 100 identifies at least one of the at least one predicted geographical location of the place 212 based on a search of the database 106 using the identification of the place 212. For example, the networked computer system 100 may identify a predicted geographical location of the place by matching the identification of the place 212 from the request with a corresponding identification of the place 212 in the database (s) 106.

At operation 770, the networked computer system 100 transmits the at least one of the at least one predicted geographical location of the place 212 to a client device 122 of another provider 120 of the transportation service of the other request, such as for use in providing map data and/or navigation instructions or guidance to the other provider 120. Additionally or alternatively, the networked computer system 100 may transmit the at least one of the at least one predicted geographical location of the place 212 to a client device 112 of the requester 110 of the transportation service of the other request, such as for use in providing map data and/or navigation instructions or guidance to the requester 110.

It is contemplated that any of the other features described within the present disclosure can be incorporated into the method 700.

Figure 8:
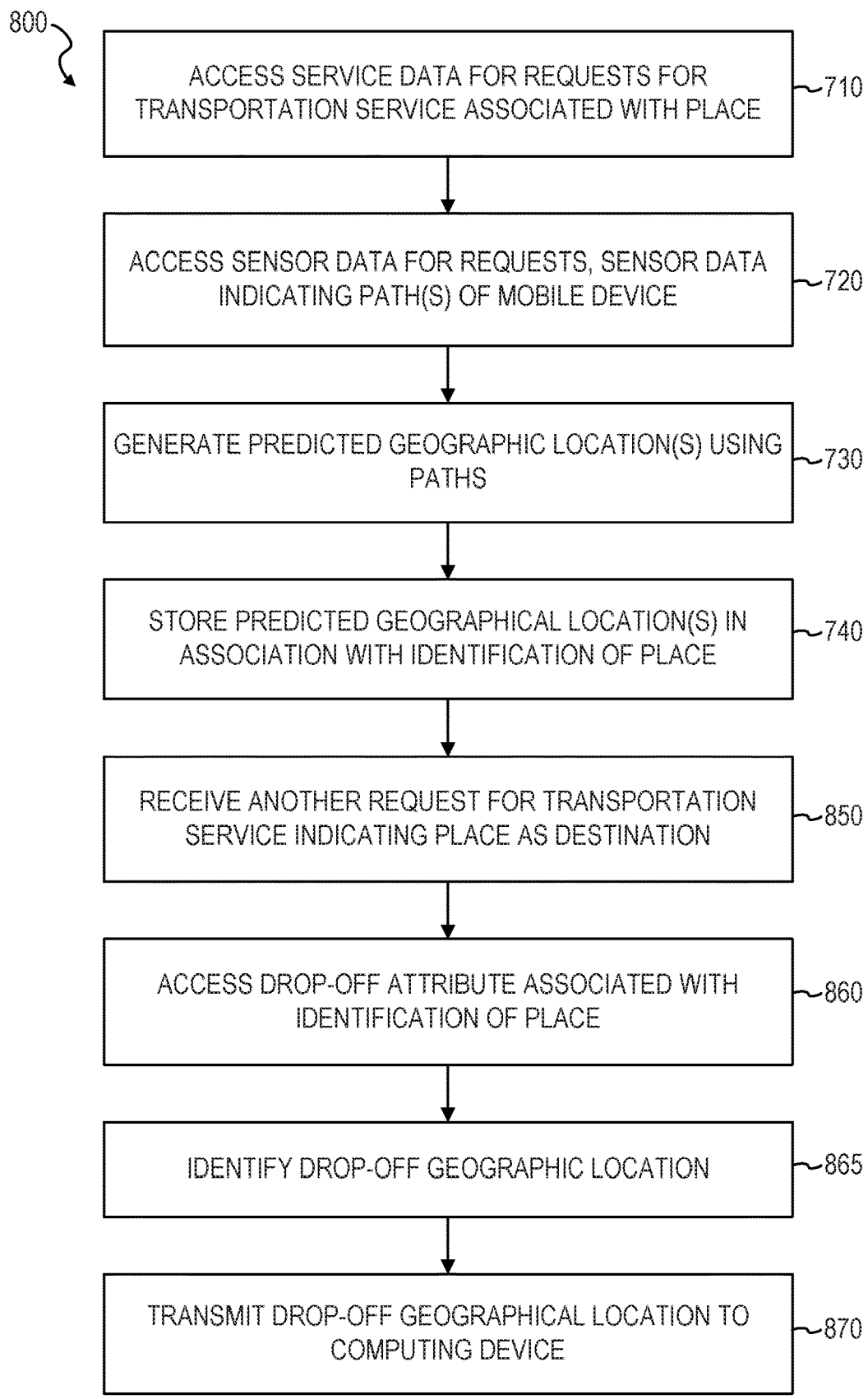
FIG. 8 is a flowchart illustrating another method of using sensor data for coordinate prediction, in accordance with some example embodiments.

FIG. 8 is a flowchart illustrating another method 800 of using sensor data for coordinate prediction, in accordance with some example embodiments. The method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the networked computer system 100 of FIG. 1, or any combination of one or more of its components or modules (e.g., prediction module 102, service module 104), as described above.

At operation 710, the networked computer system 100, for a place 212, accesses corresponding service data for each one of a plurality of requests for a transportation service associated with the place 212. The transportation service comprises transportation of a requester 110 of the request to or from the place 212. The corresponding service data comprises an identification of the place 212, pick-up data indicating a pick-up location where the transportation of the requester 110 began, and drop-off data indicating a drop-off location where the transportation of the requester 110 ended.

At operation 720, the networked computer system 100 accesses corresponding sensor data for each one of the plurality of requests. The corresponding sensor data indicates paths of a mobile device 112 of the requester 110. The paths comprise a pick-up path and a drop-off path. The pick-up path ends at the pick-up location indicated by the pick-up data, and the drop-off path begins at the drop-off location indicated by the drop-off data.

At operation 730, the networked computer system 100 generates at least one predicted geographic location using the paths indicated by the sensor data of the plurality of requests. In some example embodiments, the corresponding sensor data for each one of the plurality of requests comprises a plurality of geocodes forming the corresponding at least one path indicated by the sensor data, and the generating the at least one predicted geographic location comprises applying at least one clustering algorithm on the paths indicated by the sensor data of the plurality of requests. In some example embodiments, the at least one predicted geographical location of the place corresponds to a point of intersection among a plurality of the paths indicated by the sensor data of the plurality of requests. In some example embodiments, the at least one predicted geographical location of the place corresponds to a centroid of the paths indicated by the sensor data of the plurality of requests. In some example embodiments, the at least one predicted geographical location of the place comprises at least one geocode. In some example embodiments, the use of the paths in generating the at least one predicted geographical location is based on a determination that an amount of the service data for the place satisfies a minimum threshold amount. In some example embodiments, the networked computer system 100 generates a drop-off geographic location for the place 212 using the drop-off paths indicated by the sensor data for the plurality of requests and generates a pick-up geographic location for the place 212 using the pick-up paths indicated by the sensor data for the plurality of requests.

At operation 740, the networked computer system 100 stores the at least one predicted geographic location in a database 106 in association with an identification of the place 212. For example, the networked computer system 100 may store predicted geographic locations in accordance with the mapping 500 disclosed in the example embodiment of FIG. 5. In some example embodiments, the networked computer system 100 stores the drop-off geographic location as a drop-off attribute associated with the identification of the place 212 in the database 106 and stores the pick-up geographic location as a pick-up attribute associated with the identification of the place 212 in the database 106.

At operation 850, the networked computer system 100 receives another request for another transportation service associated with the place 212 from the client device 112 of another requester 110. The other request comprises an indication of the place 212 as a destination, and the other transportation service comprises transportation of the other requester 110 of the other request to the place 212.

At operation 860, the networked computer system 100 accesses the drop-off attribute associated with the identification of the place 212 based on the indication of the place 212 as a destination. At operation 865, the networked computer system 100 identifies the drop-off geographic location based on the accessing the drop-off attribute. For example, the networked computer system 100 may identify the drop-off geographical location of the place 212 by matching the identification of the place 212 from the request with a corresponding identification of the place 212 in the database(s) 106.

At operation 870, the networked computer system 100 transmitting the drop-off geographical location of the place 212 to the client device 122 of another provider 120 of the transportation service of the other request for display on the client device 122 of the other provider 120 in association with the other request, such as for use in providing map data and/or navigation instructions or guidance to the other provider 120. Additionally or alternatively, the networked computer system 100 may transmit the drop-off geographical location of the place 212 to a client device 112 of the requester 110 of the transportation service of the other request, such as for use in providing map data and/or navigation instructions or guidance to the requester 110.

It is contemplated that any of the other features described within the present disclosure can be incorporated into the method 800.

Figure 9:
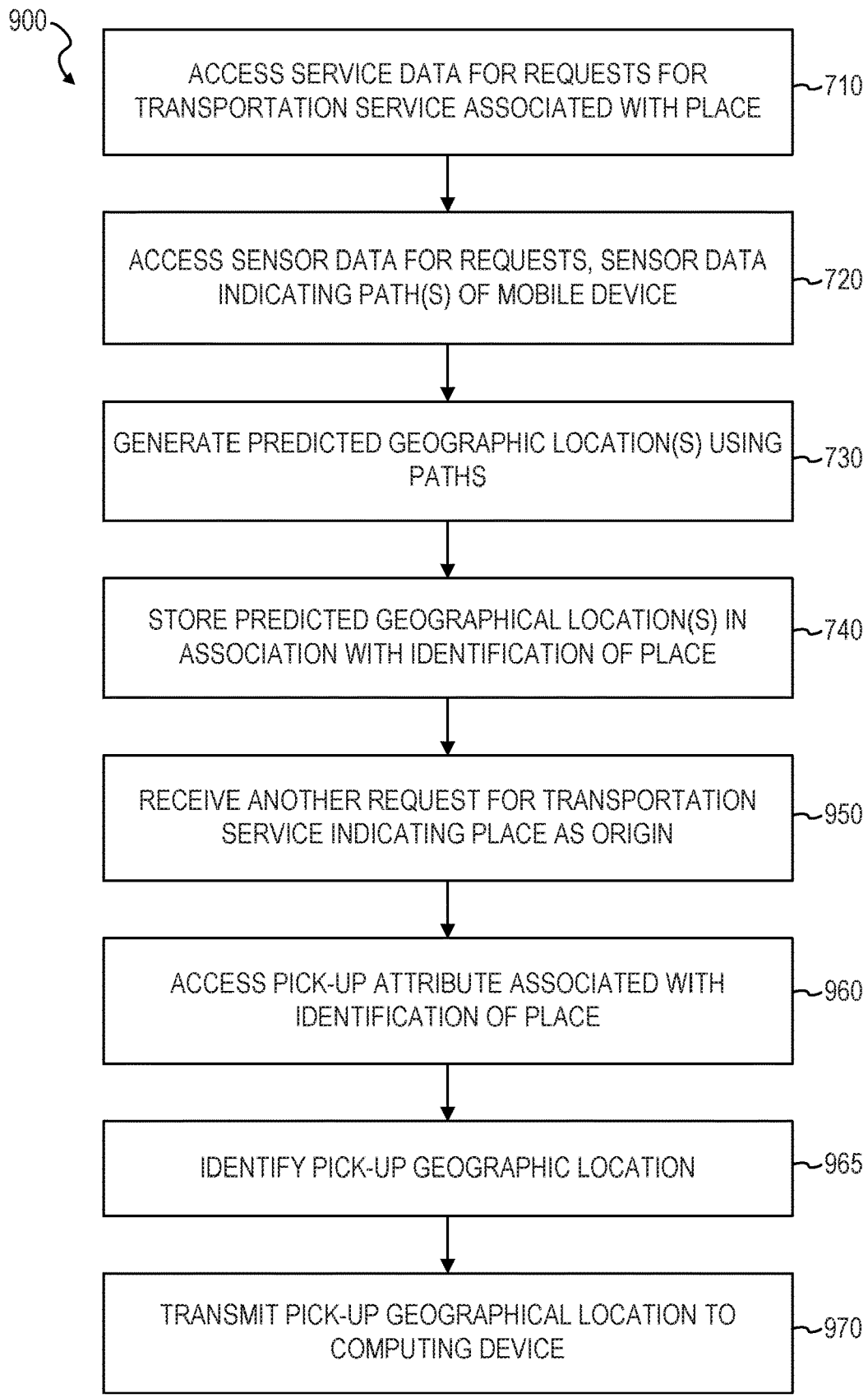
FIG. 9 is a flowchart illustrating yet another method of using sensor data for coordinate prediction, in accordance with some example embodiments.

FIG. 9 is a flowchart illustrating yet another method 900 of using sensor data for coordinate prediction, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the networked computer system 100 of FIG. 1, or any combination of one or more of its components or modules (e.g., prediction module 102, service module 104), as described above.

At operation 710, the networked computer system 100, for a place 212, accesses corresponding service data for each one of a plurality of requests for a transportation service associated with the place 212. The transportation service comprises transportation of a requester 110 of the request to or from the place 212. The corresponding service data comprises an identification of the place 212, pick-up data indicating a pick-up location where the transportation of the requester 110 began, and drop-off data indicating a drop-off location where the transportation of the requester 110 ended.

At operation 720, the networked computer system 100 accesses corresponding sensor data for each one of the plurality of requests. The corresponding sensor data indicates paths of a mobile device 112 of the requester 110. The paths comprise a pick-up path and a drop-off path. The pick-up path ends at the pick-up location indicated by the pick-up data, and the drop-off path begins at the drop-off location indicated by the drop-off data.

At operation 730, the networked computer system 100 generates at least one predicted geographic location using the paths indicated by the sensor data of the plurality of requests. In some example embodiments, the corresponding sensor data for each one of the plurality of requests comprises a plurality of geocodes forming the corresponding at least one path indicated by the sensor data, and the generating the at least one predicted geographic location comprises applying at least one clustering algorithm on the paths indicated by the sensor data of the plurality of requests. In some example embodiments, the at least one predicted geographical location of the place corresponds to a point of intersection among a plurality of the paths indicated by the sensor data of the plurality of requests. In some example embodiments, the at least one predicted geographical location of the place corresponds to a centroid of the paths indicated by the sensor data of the plurality of requests. In some example embodiments, the at least one predicted geographical location of the place comprises at least one geocode. In some example embodiments, the use of the paths in generating the at least one predicted geographical location is based on a determination that an amount of the service data for the place satisfies a minimum threshold amount. In some example embodiments, the networked computer system 100 generates a drop-off geographic location for the place 212 using the drop-off paths indicated by the sensor data for the plurality of requests and generates a pick-up geographic location for the place 212 using the pick-up paths indicated by the sensor data for the plurality of requests.

At operation 740, the networked computer system 100 stores the at least one predicted geographic location in a database 106 in association with an identification of the place 212. For example, the networked computer system 100 may store predicted geographic locations in accordance with the mapping 500 disclosed in the example embodiment of FIG. 5. In some example embodiments, the networked computer system 100 stores the drop-off geographic location as a drop-off attribute associated with the identification of the place 212 in the database 106 and stores the pick-up geographic location as a pick-up attribute associated with the identification of the place 212 in the database 106.

At operation 950, the networked computer system 100 receives another request for another transportation service associated with the place 212 from the client device 112 of another requester 110. The other request comprises an indication of the place 212 as an origin, and the other transportation service comprises transportation of the other requester 110 of the other request from the place 212.

At operation 960, the networked computer system 100 accesses the pick-up attribute associated with the identification of the place 212 based on the indication of the place 212 as an origin. At operation 865, the networked computer system 100 identifies the pick-up geographic location based on the accessing the pick-up attribute. For example, the networked computer system 100 may identify the pick-up geographical location of the place 212 by matching the identification of the place 212 from the request with a corresponding identification of the place 212 in the database(s) 106.

At operation 970, the networked computer system 100 transmitting the pick-up geographical location of the place 212 to the client device 122 of another provider 120 of the transportation service of the other request for display on the client device 122 of the other provider 120 in association with the other request, such as for use in providing map data and/or navigation instructions or guidance to the other provider 120. Additionally or alternatively, the networked computer system 100 may transmit the pick-up geographical location of the place 212 to a client device 112 of the requester 110 of the transportation service of the other request, such as for use in providing map data and/or navigation instructions or guidance to the requester 110.

It is contemplated that any of the other features described within the present disclosure can be incorporated into the method 900.

Figure 10:
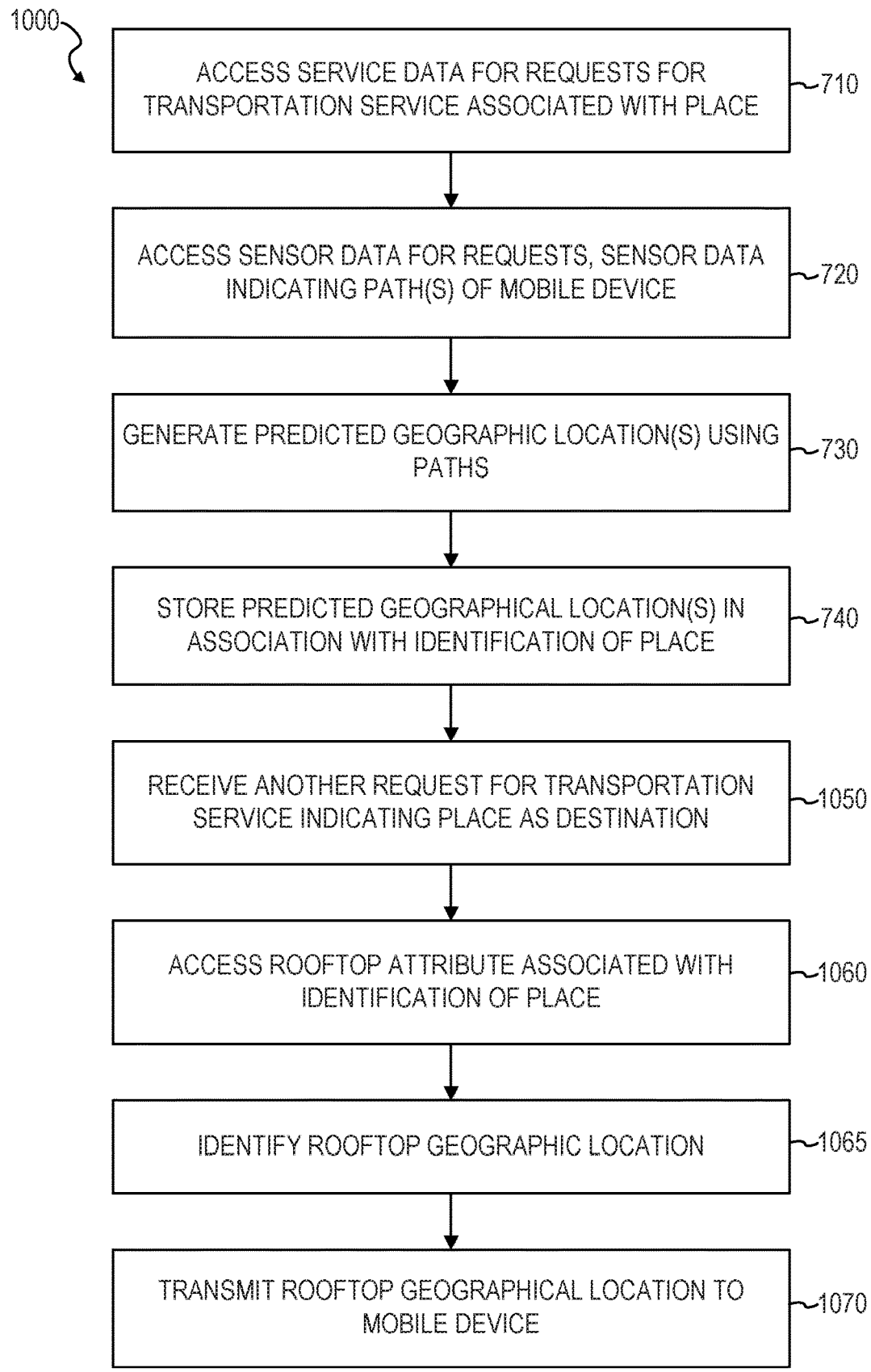
FIG. 10 is a flowchart illustrating yet another method of using sensor data for coordinate prediction, in accordance with some example embodiments.

FIG. 10 is a flowchart illustrating yet another method 1000 of using sensor data for coordinate prediction, in accordance with some example embodiments. The method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the networked computer system 100 of FIG. 1, or any combination of one or more of its components or modules (e.g., prediction module 102, service module 104), as described above.

At operation 710, the networked computer system 100, for a place 212, accesses corresponding service data for each one of a plurality of requests for a transportation service associated with the place 212. The transportation service comprises transportation of a requester 110 of the request to or from the place 212. The corresponding service data comprises an identification of the place 212, pick-up data indicating a pick-up location where the transportation of the requester 110 began, and drop-off data indicating a drop-off location where the transportation of the requester 110 ended.

At operation 720, the networked computer system 100 accesses corresponding sensor data for each one of the plurality of requests. The corresponding sensor data indicates paths of a mobile device 112 of the requester 110. The paths comprise a pick-up path and a drop-off path. The pick-up path ends at the pick-up location indicated by the pick-up data, and the drop-off path begins at the drop-off location indicated by the drop-off data.

At operation 730, the networked computer system 100 generates at least one predicted geographic location using the paths indicated by the sensor data of the plurality of requests. In some example embodiments, the corresponding sensor data for each one of the plurality of requests comprises a plurality of geocodes forming the corresponding at least one path indicated by the sensor data, and the generating the at least one predicted geographic location comprises applying at least one clustering algorithm on the paths indicated by the sensor data of the plurality of requests. In some example embodiments, the at least one predicted geographical location of the place corresponds to a point of intersection among a plurality of the paths indicated by the sensor data of the plurality of requests. In some example embodiments, the at least one predicted geographical location of the place corresponds to a centroid of the paths indicated by the sensor data of the plurality of requests. In some example embodiments, the at least one predicted geographical location of the place comprises at least one geocode. In some example embodiments, the use of the paths in generating the at least one predicted geographical location is based on a determination that an amount of the service data for the place satisfies a minimum threshold amount. In some example embodiments, the networked computer system 100 generates a rooftop geographic location for the place 212 using the paths indicated by the sensor data for the plurality of requests.

At operation 740, the networked computer system 100 stores the at least one predicted geographic location in a database 106 in association with an identification of the place 212. For example, the networked computer system 100 may store predicted geographic locations in accordance with the mapping 500 disclosed in the example embodiment of FIG. 5. In some example embodiments, the networked computer system 100 stores the rooftop geographic location as a rooftop attribute associated with the identification of the place 212 in the database 106.

At operation 1050, the networked computer system 100 receives another request for another transportation service associated with the place 212 from the client device 112 of another requester 110. The other request comprises an indication of the place 212 as a destination, and the other transportation service comprises transportation of the other requester 110 of the other request to the place 212.

At operation 1060, the networked computer system 100 accesses the rooftop attribute associated with the identification of the place 212 based on the indication of the place 212 as a destination. At operation 1065, the networked computer system 100 identifies the rooftop geographic location based on the accessing the rooftop attribute. For example, the networked computer system 100 may identify the rooftop geographical location of the place 212 by matching the identification of the place 212 from the request with a corresponding identification of the place 212 in the database (s) 106.

At operation 1070, the networked computer system 100 transmitting the rooftop geographical location of the place 212 to the client device 122 of another provider 120 of the transportation service of the other request for display on the client device 122 of the other provider 120 in association with the other request, such as for use in providing map data and/or navigation instructions or guidance to the other provider 120. Additionally or alternatively, the networked computer system 100 may transmit the rooftop geographical location of the place 212 to a client device 112 of the requester 110 of the transportation service of the other request, such as for use in providing map data and/or navigation guidance information to the requester 110. In some example embodiments, the navigation guidance information comprises guidance for navigating to the rooftop geographical location from a drop-off geographical location where the transportation service corresponding to the other request has been completed or is estimated to be completed.

It is contemplated that any of the other features described within the present disclosure can be incorporated into the method 1000.

Figure 11:
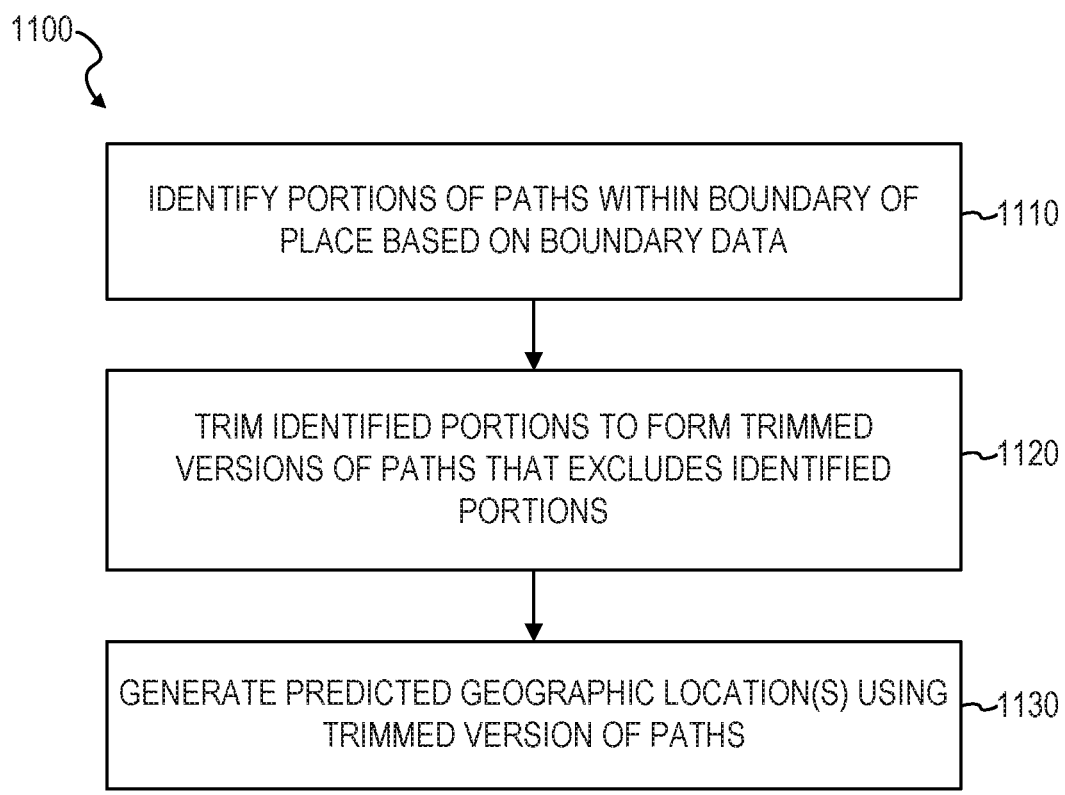
FIG. 11 is a flowchart illustrating a method of generating a predicted geographic location for a place, in accordance with some example embodiments.

FIG. 11 is a flowchart illustrating a method 1100 of generating a predicted geographic location for the place 212, in accordance with some example embodiments. The method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the networked computer system 100 of FIG. 1, or any combination of one or more of its components or modules (e.g., prediction module 102, service module 104), as described above.

In some example embodiments, the generating the at least one predicted geographic location, such as in operation 730 of FIGS. 7, 8, 9, and 10, also uses boundary data of the place 212. The boundary data comprises at least one of map data of the place, GPS data of the client device 112 of the requester 110, Wi-Fi data of the client device 112 of the requester 110, and architectural data of the place 212. The GPS data indicates a GPS signal strength, and the Wi-Fi data indicates a Wi-Fi signal strength.

At operation 1110, the networked computer system 100, for each one of the plurality of requests, identifies a portion of the at least one path indicated by the corresponding sensor data that is within a boundary of the place based on the boundary data of the place. At operation 1120, the networked computer system 100, for each one of the plurality of requests, trims the identified portion of the at least one path indicated by the corresponding sensor data to form a trimmed version of the at least one path that excludes the identified portion. At operation 1130, the networked computer system 100, generates the at least one predicted geographic location using the trimmed versions of the paths indicated by the sensor data of the plurality of requests.

It is contemplated that any of the other features described within the present disclosure can be incorporated into the method 700.

It is contemplated that any features of any embodiments disclosed herein can be combined with any other features of any other embodiments disclosed herein. Accordingly, these any such hybrid embodiments are within the scope of the present disclosure.

Example Mobile Device

Figure 13:
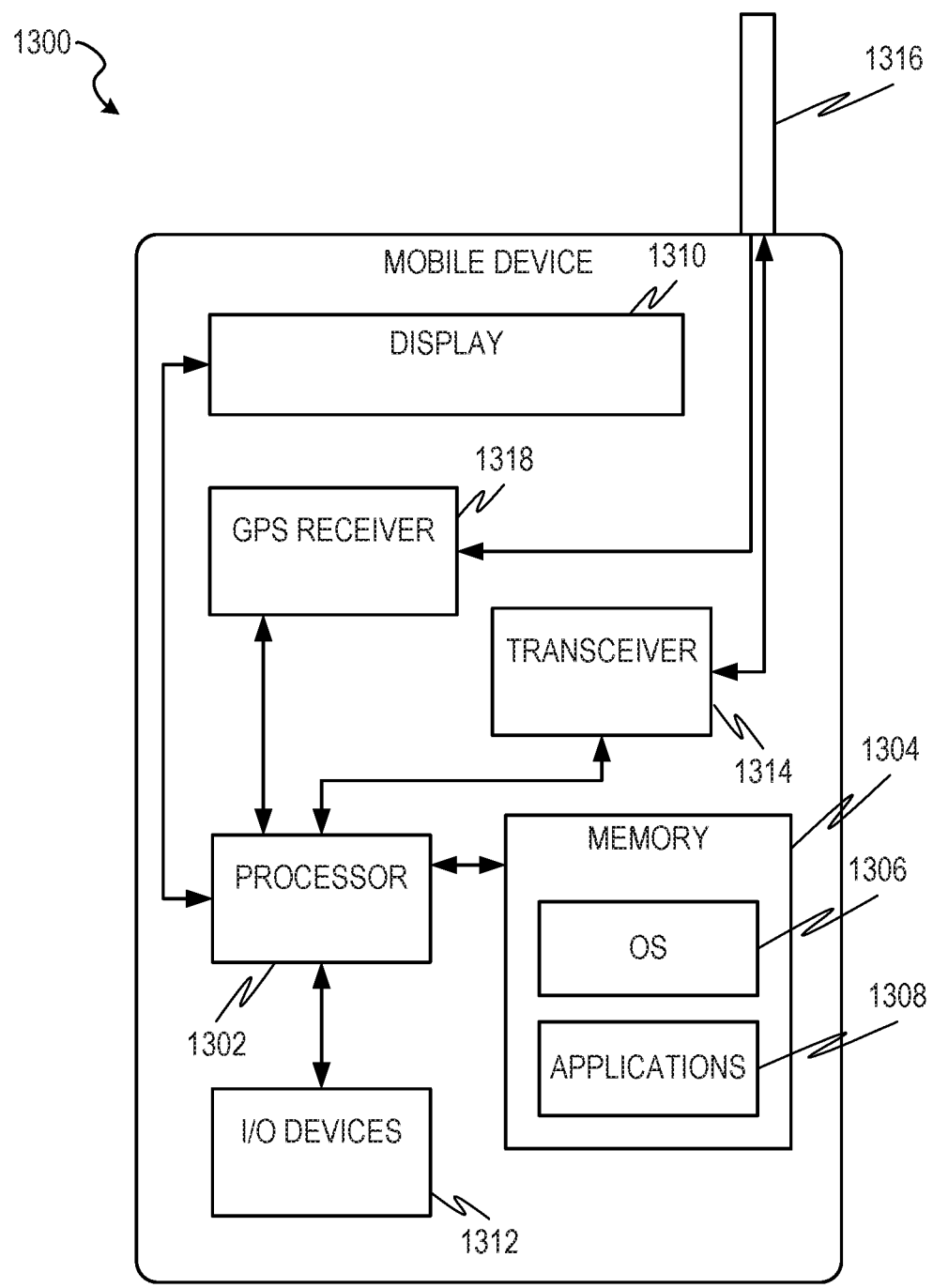
FIG. 13 is a block diagram illustrating a mobile device, in accordance with some example embodiments.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location-enabled application that can provide location-based services (LBSs) to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
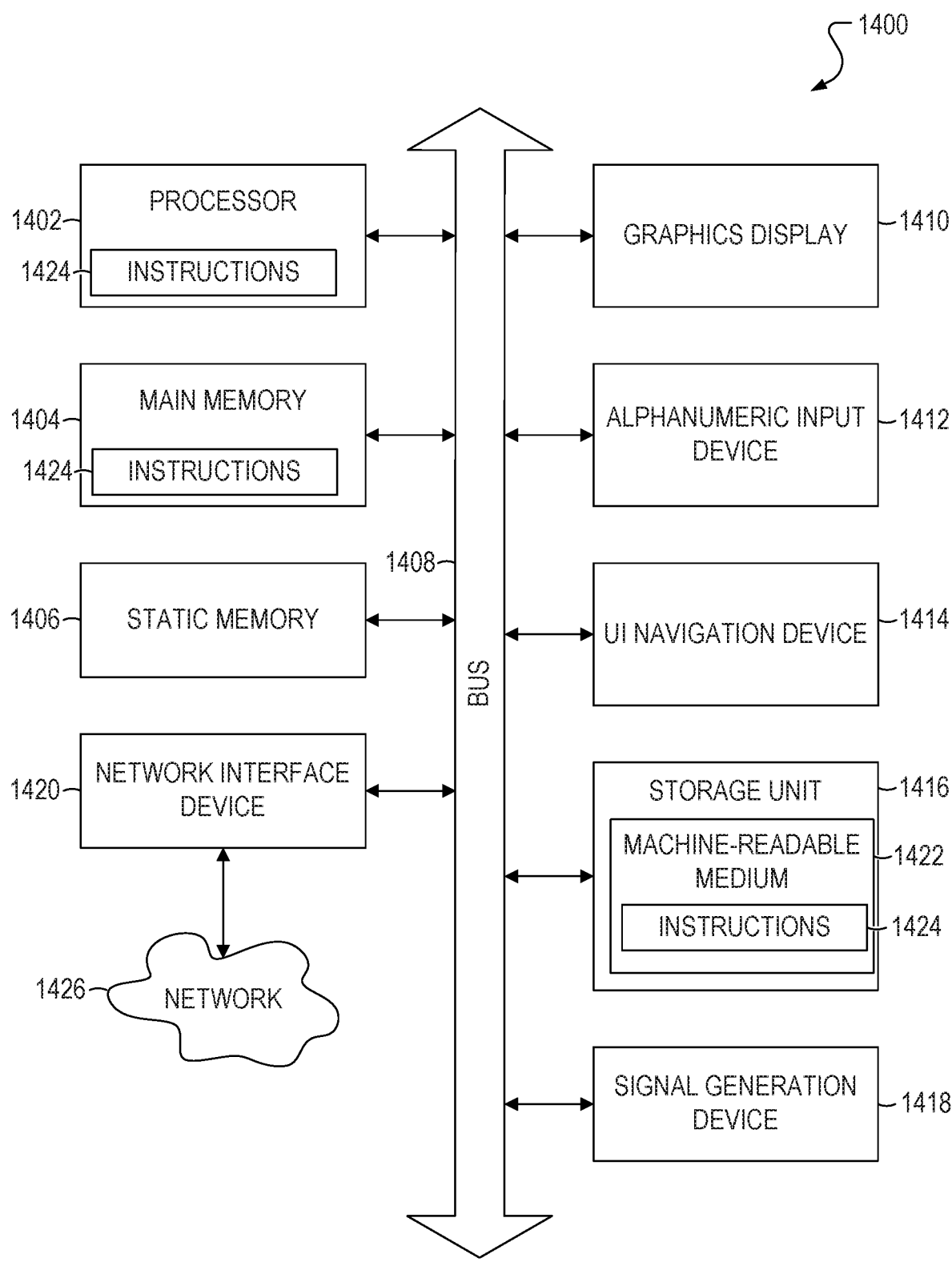
FIG. 14 is a diagrammatic representation of a machine in the form of a computer system within which a set of instructions may be executed for causing the machine to perform any one or more of the methodologies discussed herein, according to an example embodiment.

FIG. 14 is a block diagram of an example computer system 1400 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a graphics display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a storage unit 1416, a signal generation device 1418 (e.g., a speaker) and a network interface device 1420.

Machine-Readable Medium

The storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions (e.g., instructions 1424) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Executable Instructions and Machine-Storage Medium

The various memories (i.e., 1404, 1406, and/or memory of the processor(s) 1402) and/or storage unit 1416 may store one or more sets of instructions and data structures (e.g., software) 1424 embodying or utilized by any one or more of the methodologies or functions described herein. These instructions, when executed by processor(s) 1402 cause various operations to implement the disclosed embodiments.

As used herein, the terms "machine-storage medium," "device-storage medium," "computer-storage medium" (referred to collectively as "machine-storage medium 1422") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1422 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1422 specifically exclude carrier waves, modulated data signals, and other such media, at least some of which are covered under the term "signal medium" discussed below.

Signal Medium

The term "signal medium" or "transmission medium" in this disclosure shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Numbered Examples of Embodiments

The following numbered examples are embodiments.

1. A computer-implemented method comprising:
    for a place, accessing, by a computer system having at least one hardware processor, corresponding service data for each one of a plurality of requests for a transportation service associated with the place, the transportation service comprising transportation of a requester of the request to or from the place, the corresponding service data comprising an identification of the place, pick-up data indicating a pick-up location where the transportation of the requester began, and drop-off data indicating a drop-off location where the transportation of the requester ended;

accessing, by the computer system, corresponding sensor data for each one of the plurality of requests, the corresponding sensor data indicating at least one path of a mobile device of the requester, the at least one path comprising at least one of a pick-up path and a drop-off path, the pick-up path ending at the pick-up location indicated by the pick-up data, the drop-off path beginning at the drop-off location indicated by the drop-off data;

generating, by the computer system, at least one predicted geographic location using the paths indicated by the sensor data of the plurality of requests; and storing, by the computer system, the at least one predicted geographic location in a database in association with an identification of the place.

2. The computer-implemented method of example 1, further comprising:

receiving, by the computer system, another request for the transportation service associated with the place from a computing device of another requester, the other request comprising the identification of the place;

identifying, by the computer system, at least one of the at least one predicted geographical location of the place based on a search of the database using the identification of the place; and transmitting, by the computer system, the at least one of the at least one predicted geographical location of the place to a computing device of another provider of the transportation service of the other request.

3. The computer-implemented method of example 1 or example 2, wherein:

the corresponding sensor data for each one of the plurality of requests comprises a plurality of geocodes forming the corresponding at least one path indicated by the sensor data; and the generating the at least one predicted geographic location comprising applying at least one clustering algorithm on the paths indicated by the sensor data of the plurality of requests.

4. The computer-implemented method of example 3, wherein the generating the at least one predicted geographic location further comprises:

determining a point of peak concentration from among the paths indicated by the sensor data of the plurality of requests based on the application of the at least one clustering algorithm on the paths indicated by the sensor data of the plurality of requests; and generating the at least one predicted geographic location based on the point of peak concentration.

5. The computer-implemented method of any one of examples 1 to 4, wherein the at least one predicted geographical location of the place corresponds to a point of intersection among a plurality of the paths indicated by the sensor data of the plurality of requests.

6. The computer-implemented method of any one of examples 1 to 5, wherein the at least one predicted geographical location of the place corresponds to a centroid of the paths indicated by the sensor data of the plurality of requests.

7. The computer-implemented method of any one of examples 1 to 6, wherein the at least one predicted geographical location of the place comprises at least one geocode.

8. The computer-implemented method of any one of examples 1 to 7, wherein the use of the paths in generating the at least one predicted geographical location is based on a determination that an amount of the service data for the place satisfies a minimum threshold amount.

9. The computer-implemented method of any one of examples 1 to 8, wherein:

for each one of the plurality of requests, the at least one path indicated by the sensor data comprises the pick-up path and the drop-off path;

the generating the at least one predicted geographic location comprises generating a drop-off geographic location for the place using the drop-off paths indicated by the sensor data for the plurality of requests and generating a pick-up geographic location for the place using the pick-up paths indicated by the sensor data for the plurality of requests; and the storing the at least one predicted geographic location comprises storing the drop-off geographic location as a drop-off attribute associated with the identification of the place in the database and storing the pick-up geographic location as a pick-up attribute associated with the identification of the place in the database.

10. The computer-implemented method of example 9, further comprising:

receiving, by the computer system, another request for another transportation service associated with the place from a mobile device of another requester, the other request comprising an indication of the place as a destination, and the other transportation service comprising transportation of the other requester of the other request to the place;

accessing, by the computer system, the drop-off attribute associated with the identification of the place based on the indication of the place as a destination;

identifying, by the computer system, the drop-off geographic location based on the accessing the drop-off attribute; and transmitting, by the computer system, the drop-off geographical location of the place to a computing device of another provider of the transportation service of the other request for display on the computing device of the other provider in association with the other request.

11. The computer-implemented method of claim 9, further comprising:

receiving, by the computer system, another request for another transportation service associated with the place from a mobile device of another requester, the other request comprising an indication of the place as an origin, and the other transportation service comprising transportation of the other requester of the other request from the place;

accessing, by the computer system, the pick-up attribute associated with the identification of the place based on the indication of the place as an origin;

identifying, by the computer system, the pick-up geographic location based on the accessing the pick-up attribute; and transmitting, by the computer system, the pick-up geographical location of the place to a computing device of another provider of the transportation service of the other request for display on the computing device of the other provider in association with the other request.

12. The computer-implemented method of any one of examples 1 to 11, wherein the generating the at least one predicted geographic location also uses boundary data of the place, the boundary data comprising at least one of map data of the place, global positioning system (GPS) data of the mobile device of the requester, Wi-Fi data of the mobile device of the requester, and architectural data of the place.

13. The computer-implemented method of example 12, wherein the generating the at least one predicted geographic location comprises:
- for each one of the plurality of requests, identifying a portion of the at least one path indicated by the corresponding sensor data that is within a boundary of the place based on the boundary data of the place;
- for each one of the plurality of requests, trimming the identified portion of the at least one path indicated by the corresponding sensor data to form a trimmed version of the at least one path that excludes the identified portion; and
- generating the at least one predicted geographic location using the trimmed versions of the paths indicated by the sensor data of the plurality of requests.

14. The computer-implemented method of example 12, wherein the boundary data comprises at least one of the GPS data of the mobile device of the requester and the Wi-Fi data of the mobile device of the requester, the GPS data indicating a GPS signal strength, and the Wi-Fi data indicating a Wi-Fi signal strength.

15. The computer-implemented method of any one of examples 1 to 14, wherein the generating the at least one predicted geographic location comprises generating a rooftop geographic location for the place using the paths indicated by the sensor data for the plurality of requests, and the storing the at least one predicted geographic location comprises storing the rooftop geographic location as a rooftop attribute associated with the identification of the place in the database, the computer-implemented method further comprising:
- receiving, by the computer system, another request for another transportation service associated with the place from a mobile device of another requester, the other request comprising an indication of the place as a destination, and the other transportation service comprising transportation of the other requester of the other request to the place;
- accessing, by the computer system, the rooftop attribute associated with the identification of the place based on receiving of the other request;
- identifying, by the computer system, the rooftop geographic location based on the accessing the rooftop attribute; and
- transmitting, by the computer system, the rooftop geographical location of the place to a mobile device of the other requester of the transportation service of the other request for display on the mobile device of the other requester in association with the other request.

16. The computer-implemented method of example 15, wherein the transmitting of the rooftop geographical location of the place to the mobile device of the other requester comprises navigation guidance information to the mobile device of the other requester for display on the mobile device of the other requester, the navigation guidance information comprising guidance for navigating to the rooftop geographical location from a drop-off geographical location where the transportation service corresponding to the other request has been completed or is estimated to be completed.

15. A system comprising:
- at least one hardware processor; and
- a machine-readable medium embodying a set of instructions that, when executed by the at least one hardware processor, cause the at least one hardware processor to perform the method of any one of examples 1 to 16.

16. A machine-readable medium embodying a set of instructions that, when executed by the at least one hardware processor, cause the at least one hardware processor to perform the method of any one of examples 1 to 16.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
- for a place, accessing, by a computer system having at least one hardware processor, corresponding service data for each one of a plurality of requests for a transportation service associated with the place, the transportation service comprising transportation of a requester of the request to or from the place, the corresponding service data comprising an identification of the place, pick-up data indicating a pick-up location where the transportation of the requester began, and drop-off data indicating a drop-off location where the transportation of the requester ended;
- accessing, by the computer system, corresponding sensor data for each one of the plurality of requests, the corresponding sensor data indicating at least one path of a mobile device of the requester, the at least one path comprising at least one of a pick-up path and a drop-off path, the pick-up path ending at the pick-up location indicated by the pick-up data, the drop-off path beginning at the drop-off location indicated by the drop-off data;
- generating, by the computer system, at least one predicted geographic location using the paths indicated by the sensor data of the plurality of requests; and
- storing, by the computer system, the at least one predicted geographic location in a database in association with an identification of the place.

2. The computer-implemented method of claim 1, further comprising:
- receiving, by the computer system, another request for the transportation service associated with the place from a computing device of another requester, the other request comprising the identification of the place;

identifying, by the computer system, at least one of the at least one predicted geographical location of the place based on a search of the database using the identification of the place; and transmitting, by the computer system, the at least one of the at least one predicted geographical location of the place to a computing device of another provider of the transportation service of the other request.

3. The computer-implemented method of claim 1, wherein:

the corresponding sensor data for each one of the plurality of requests comprises a plurality of geocodes forming the corresponding at least one path indicated by the sensor data; and the generating the at least one predicted geographic location comprising applying at least one clustering algorithm on the paths indicated by the sensor data of the plurality of requests.

4. The computer-implemented method of claim 3, wherein the generating the at least one predicted geographic location further comprises:

determining a point of peak concentration from among the paths indicated by the sensor data of the plurality of requests based on the application of the at least one clustering algorithm on the paths indicated by the sensor data of the plurality of requests; and generating the at least one predicted geographic location based on the point of peak concentration.

5. The computer-implemented method of claim 1, wherein the at least one predicted geographical location of the place corresponds to a point of intersection among a plurality of the paths indicated by the sensor data of the plurality of requests.

6. The computer-implemented method of claim 1, wherein the at least one predicted geographical location of the place comprises at least one geocode.

7. The computer-implemented method of claim 1, wherein the use of the paths in generating the at least one predicted geographical location is based on a determination that an amount of the service data for the place satisfies a minimum threshold amount.

8. The computer-implemented method of claim 1, wherein:

for each one of the plurality of requests, the at least one path indicated by the sensor data comprises the pick-up path and the drop-off path;

the generating the at least one predicted geographic location comprises generating a drop-off geographic location for the place using the drop-off paths indicated by the sensor data for the plurality of requests and generating a pick-up geographic location for the place using the pick-up paths indicated by the sensor data for the plurality of requests; and the storing the at least one predicted geographic location comprises storing the drop-off geographic location as a drop-off attribute associated with the identification of the place in the database and storing the pick-up geographic location as a pick-up attribute associated with the identification of the place in the database.

9. The computer-implemented method of claim 8, further comprising:

receiving, by the computer system, another request for another transportation service associated with the place from a mobile device of another requester, the other request comprising an indication of the place as a destination, and the other transportation service comprising transportation of the other requester of the other request to the place;

accessing, by the computer system, the drop-off attribute associated with the identification of the place based on the indication of the place as a destination;

identifying, by the computer system, the drop-off geographic location based on the accessing the drop-off attribute; and transmitting, by the computer system, the drop-off geographical location of the place to a computing device of another provider of the transportation service of the other request for display on the computing device of the other provider in association with the other request.

10. The computer-implemented method of claim 8, further comprising:

receiving, by the computer system, another request for another transportation service associated with the place from a mobile device of another requester, the other request comprising an indication of the place as an origin, and the other transportation service comprising transportation of the other requester of the other request from the place;

accessing, by the computer system, the pick-up attribute associated with the identification of the place based on the indication of the place as an origin;

identifying, by the computer system, the pick-up geographic location based on the accessing the pick-up attribute; and transmitting, by the computer system, the pick-up geographical location of the place to a computing device of another provider of the transportation service of the other request for display on the computing device of the other provider in association with the other request.

11. The computer-implemented method of claim 1, wherein the generating the at least one predicted geographic location also uses boundary data of the place, the boundary data comprising at least one of map data of the place, global positioning system (GPS) data of the mobile device of the requester, Wi-Fi data of the mobile device of the requester, and architectural data of the place.

12. The computer-implemented method of claim 11, wherein the generating the at least one predicted geographic location comprises:

for each one of the plurality of requests, identifying a portion of the at least one path indicated by the corresponding sensor data that is within a boundary of the place based on the boundary data of the place;

for each one of the plurality of requests, trimming the identified portion of the at least one path indicated by the corresponding sensor data to form a trimmed version of the at least one path that excludes the identified portion; and generating the at least one predicted geographic location using the trimmed versions of the paths indicated by the sensor data of the plurality of requests.

13. The computer-implemented method of claim 11, wherein the boundary data comprises at least one of the GPS data of the mobile device of the requester and the Wi-Fi data of the mobile device of the requester, the GPS data indicating a GPS signal strength, and the Wi-Fi data indicating a Wi-Fi signal strength.

14. The computer-implemented method of claim 1, wherein the generating the at least one predicted geographic location comprises generating a rooftop geographic location for the place using the paths indicated by the sensor data for the plurality of requests, and the storing the at least one predicted geographic location comprises storing the rooftop geographic location as a rooftop attribute associated with the identification of the place in the database, the computer-implemented method further comprising:

receiving, by the computer system, another request for another transportation service associated with the place from a mobile device of another requester, the other request comprising an indication of the place as a destination, and the other transportation service comprising transportation of the other requester of the other request to the place;

accessing, by the computer system, the rooftop attribute associated with the identification of the place based on receiving of the other request;

identifying, by the computer system, the rooftop geographic location based on the accessing the rooftop attribute; and transmitting, by the computer system, the rooftop geographical location of the place to a mobile device of the other requester of the transportation service of the other request for display on the mobile device of the other requester in association with the other request.

15. The computer-implemented method of claim 14, wherein the transmitting of the rooftop geographical location of the place to the mobile device of the other requester comprises navigation guidance information to the mobile device of the other requester for display on the mobile device of the other requester, the navigation guidance information comprising guidance for navigating to the rooftop geographical location from a drop-off geographical location where the transportation service corresponding to the other request has been completed or is estimated to be completed.

16. A system comprising:
at least one hardware processor; and
a non-transitory machine-readable medium embodying a set of instructions that, when executed by the at least one hardware processor, cause the at least one processor to perform operations, the operations comprising:
for a place, accessing corresponding service data for each one of a plurality of requests for a transportation service associated with the place, the transportation service comprising transportation of a requester of the request to or from the place, the corresponding service data comprising an identification of the place, pick-up data indicating a pick-up location where the transportation of the requester began, and drop-off data indicating a drop-off location where the transportation of the requester ended;
accessing corresponding sensor data for each one of the plurality of requests, the corresponding sensor data indicating at least one path of a mobile device of the requester, the at least one path comprising at least one of a pick-up path and a drop-off path, the pick-up path ending at the pick-up location indicated by the pick-up data, the drop-off path beginning at the drop-off location indicated by the drop-off data;
generating at least one predicted geographic location using the paths indicated by the sensor data of the plurality of requests; and
storing the at least one predicted geographic location in a database in association with an identification of the place.

17. The system of claim 16, wherein the operations further comprise:
receiving another request for the transportation service associated with the place from a computing device of another requester, the other request comprising the identification of the place;
identifying at least one of the at least one predicted geographical location of the place based on a search of the database using the identification of the place; and
transmitting the at least one of the at least one predicted geographical location of the place to a computing device of another provider of the transportation service of the other request.

18. The system of claim 16, wherein:
the corresponding sensor data for each one of the plurality of requests comprises a plurality of geocodes forming the corresponding at least one path indicated by the sensor data; and
the generating the at least one predicted geographic location comprising applying at least one clustering algorithm on the paths indicated by the sensor data of the plurality of requests.

19. The system of claim 16, wherein the at least one predicted geographical location of the place corresponds to either a point of intersection among a plurality of the paths indicated by the sensor data of the plurality of requests or a centroid of the paths indicated by the sensor data of the plurality of requests.

20. A non-transitory machine-readable medium embodying a set of instructions that, when executed by at least one hardware processor, cause the processor to perform operations, the operations comprising:
for a place, accessing corresponding service data for each one of a plurality of requests for a transportation service associated with the place, the transportation service comprising transportation of a requester of the request to or from the place, the corresponding service data comprising an identification of the place, pick-up data indicating a pick-up location where the transportation of the requester began, and drop-off data indicating a drop-off location where the transportation of the requester ended;
accessing corresponding sensor data for each one of the plurality of requests, the corresponding sensor data indicating at least one path of a mobile device of the requester, the at least one path comprising at least one of a pick-up path and a drop-off path, the pick-up path ending at the pick-up location indicated by the pick-up data, the drop-off path beginning at the drop-off location indicated by the drop-off data;
generating at least one predicted geographic location using the paths indicated by the sensor data of the plurality of requests; and
storing the at least one predicted geographic location in a database in association with an identification of the place.

* * * * *